US008467102B2

(12) United States Patent
Sano et al.

(10) Patent No.: US 8,467,102 B2
(45) Date of Patent: Jun. 18, 2013

(54) IMAGE FORMING APPARATUS AND IMAGE CORRECTION METHOD FOR CORRECTING SCAN-LINE POSITION ERROR

(75) Inventors: Shinji Sano, Kawasaki (JP); Manabu Takebayashi, Isehara (JP)

(73) Assignee: Canon Kabushiki Kaisha, Tokyo (JP)

(*) Notice: Subject to any disclaimer, the term of this patent is extended or adjusted under 35 U.S.C. 154(b) by 980 days.

(21) Appl. No.: 12/179,122

(22) Filed: Jul. 24, 2008

(65) Prior Publication Data

US 2009/0034007 A1 Feb. 5, 2009

(30) Foreign Application Priority Data

Jul. 31, 2007 (JP) ................................. 2007-199901

(51) Int. Cl.

| | |
|---|---|
| ***G06K 15/00*** | (2006.01) |
| *G03G 15/01* | (2006.01) |
| *G03G 15/00* | (2006.01) |

(52) U.S. Cl.

USPC ......... 358/3.13; 358/1.9; 358/3.02; 358/3.03; 358/3.27; 358/448; 358/518; 358/520; 358/525

(58) Field of Classification Search

None

See application file for complete search history.

(56) References Cited

U.S. PATENT DOCUMENTS

| | | | | |
|---|---|---|---|---|
| 5,235,436 | A | 8/1993 | Sakamoto et al. | 358/462 |
| 5,438,431 | A * | 8/1995 | Ostromoukhov | 358/3.18 |
| 5,815,605 | A | 9/1998 | Koike | 382/269 |
| 6,118,463 | A | 9/2000 | Houki et al. | |
| 6,134,022 | A | 10/2000 | Yamamoto et al. | 358/1.9 |
| 6,236,827 | B1 | 5/2001 | Hada | 399/301 |
| 6,487,309 | B1 | 11/2002 | Chen | 382/162 |
| 6,731,400 | B1 * | 5/2004 | Nakamura et al. | 358/1.9 |
| 6,963,423 | B2 | 11/2005 | Ogasahara et al. | 358/1.8 |
| 7,286,717 | B2 | 10/2007 | Nomizu | 382/280 |
| 7,344,217 | B2 * | 3/2008 | Kitamura et al. | 347/15 |
| 7,684,079 | B2 | 3/2010 | Takata et al. | 358/1.9 |
| 7,692,832 | B2 | 4/2010 | Klassen | |
| 2003/0206308 | A1 | 11/2003 | Matsuya | 358/1.9 |
| 2005/0220523 | A1 | 10/2005 | Fujimori | 400/76 |
| 2006/0119895 | A1 * | 6/2006 | Takata et al. | 358/3.26 |
| 2006/0226338 | A1 | 10/2006 | Tojima et al. | 250/208.1 |
| 2006/0232620 | A1 * | 10/2006 | Kitamura et al. | 347/15 |
| 2007/0103728 | A1 | 5/2007 | Otani | 358/1.18 |
| 2008/0246984 | A1 | 10/2008 | Shoji | 358/1.13 |
| 2009/0034004 | A1 | 2/2009 | Nakamura | 358/3.03 |
| 2009/0034029 | A1 | 2/2009 | Nakamura | 358/505 |
| 2009/0034034 | A1 | 2/2009 | Ido | 358/525 |

FOREIGN PATENT DOCUMENTS

| | | |
|---|---|---|
| JP | 1-227576 | 9/1989 |
| JP | 10-324027 | 12/1998 |
| JP | 2002-116394 | 4/2002 |
| JP | 2003-241131 | 8/2003 |
| JP | 2004-170755 | 6/2004 |

(Continued)

*Primary Examiner* — Steven Kau

(74) *Attorney, Agent, or Firm* — Fitzpatrick, Cella, Harper & Scinto

(57) ABSTRACT

A scan line profile characteristic representing the distortion of a scan line is detected. Dot image data undergoes the screen process using a dither matrix. At this time, the quantization process is done by shifting a dither matrix element in the sub-scanning direction opposite to the direction of the scan line changing process at a scan line changing point in the scan line changing process in accordance with the profile characteristic. The image data after the screen process undergoes the scan line changing process, and the interpolation process smooths the scan line changing point.

6 Claims, 27 Drawing Sheets

FOREIGN PATENT DOCUMENTS

| | | | |
|---|---|---|---|
| JP | 2006-248096 | * | 9/2005 |
| JP | 2006-248096 | * | 9/2006 |
| JP | 2007-136825 | | 6/2007 |

* cited by examiner

FIG. 6A

DIRECTION: UPWARD SHIFT

NUMBER OF PIXELS TO BE INTERPOLATED : 16

| | | | | | | | | | | | | | | | | |
|---|---|---|---|---|---|---|---|---|---|---|---|---|---|---|---|---|
| W1 | 0 | 0 | 0 | 0 | 0 | 0 | 0 | 0 | 0 | 0 | 0 | 0 | 0 | 0 | 0 | 0 |
| W2 | 33 | 31 | 29 | 27 | 25 | 23 | 21 | 19 | 17 | 15 | 13 | 11 | 9 | 7 | 5 | 3 |
| W3 | 3 | 5 | 7 | 9 | 11 | 13 | 15 | 17 | 19 | 21 | 23 | 25 | 27 | 29 | 31 | 33 |

FIG. 6B

NUMBER OF PIXELS TO BE INTERPOLATED : 16

| | | | | | | | | | | | | | | | | |
|---|---|---|---|---|---|---|---|---|---|---|---|---|---|---|---|---|
| W1 | 0 | 0 | 0 | 0 | 0 | 0 | 0 | 0 | 0 | 0 | 0 | 0 | 0 | 0 | 0 | 0 |
| W2 | 9 | 9 | 8 | 8 | 7 | 7 | 6 | 5 | 5 | 4 | 3 | 3 | 2 | 2 | 1 | 1 |
| W3 | 1 | 1 | 2 | 2 | 3 | 3 | 4 | 5 | 5 | 6 | 7 | 7 | 8 | 8 | 9 | 9 |

FIG. 6C

DIRECTION: DOWNWARD SHIFT

NUMBER OF PIXELS TO BE INTERPOLATED : 16

| | | | | | | | | | | | | | | | | |
|---|---|---|---|---|---|---|---|---|---|---|---|---|---|---|---|---|
| W1 | 3 | 5 | 7 | 9 | 11 | 13 | 15 | 17 | 19 | 21 | 23 | 25 | 27 | 29 | 31 | 33 |
| W2 | 33 | 31 | 29 | 27 | 25 | 23 | 21 | 19 | 17 | 15 | 13 | 11 | 9 | 7 | 5 | 3 |
| W3 | 0 | 0 | 0 | 0 | 0 | 0 | 0 | 0 | 0 | 0 | 0 | 0 | 0 | 0 | 0 | 0 |

FIG. 6D

NUMBER OF PIXELS TO BE INTERPOLATED : 16

| | | | | | | | | | | | | | | | | |
|---|---|---|---|---|---|---|---|---|---|---|---|---|---|---|---|---|
| W1 | 1 | 1 | 2 | 2 | 3 | 3 | 4 | 5 | 5 | 6 | 7 | 7 | 8 | 8 | 9 | 9 |
| W2 | 9 | 9 | 8 | 8 | 7 | 7 | 6 | 5 | 5 | 4 | 3 | 3 | 2 | 2 | 1 | 1 |
| W3 | 0 | 0 | 0 | 0 | 0 | 0 | 0 | 0 | 9 | 0 | 0 | 0 | 0 | 0 | 0 | 0 |

FIG. 9A
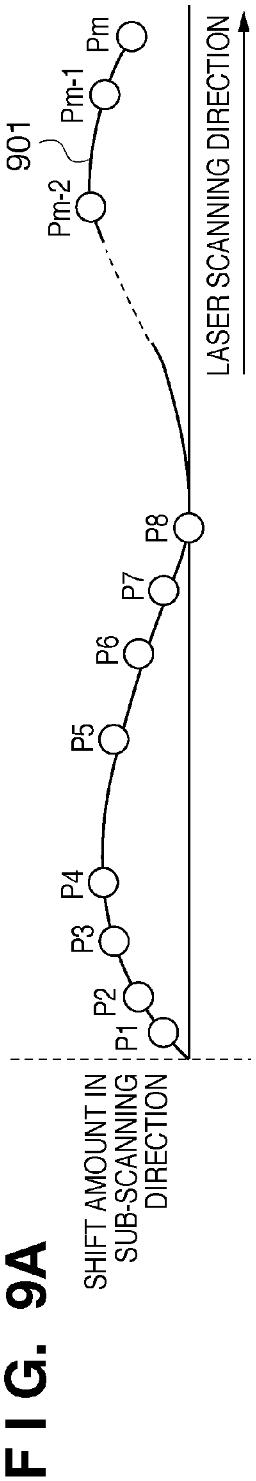
FIG. 9B
902
| SCAN LINE CHANGING POINT | P1 | P2 | P3 | P4 | P5 | P6 | P7 | P8 | ---------- | Pm-2 | Pm-1 | Pm |
|---|---|---|---|---|---|---|---|---|---|---|---|---|
| DIRECTION | ↑ | ↑ | ↑ | ↓ | ↓ | ↓ | ↓ | ↑ | ---------- | ↓ | ↓ | - |
FIG. 9C
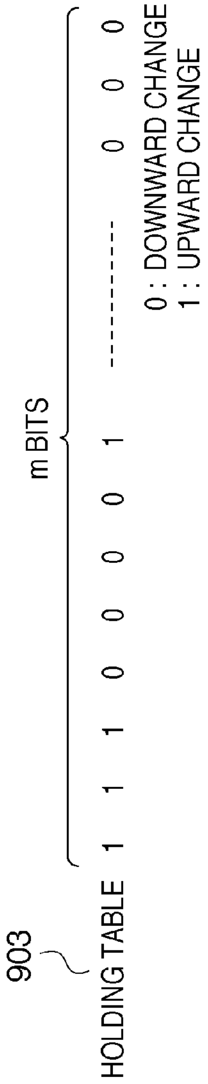
FIG. 9D

FIG. 16A
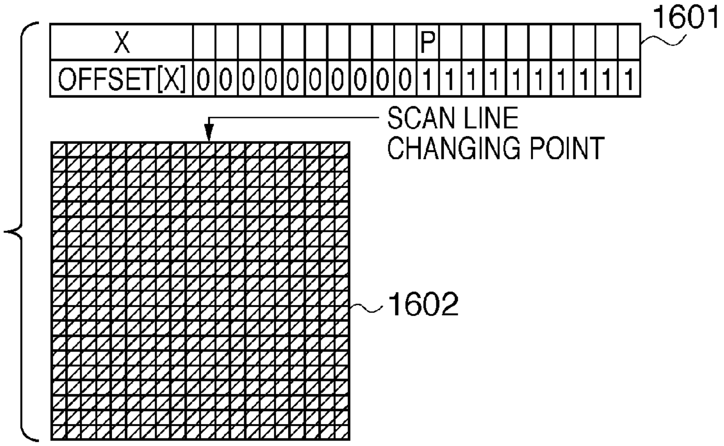
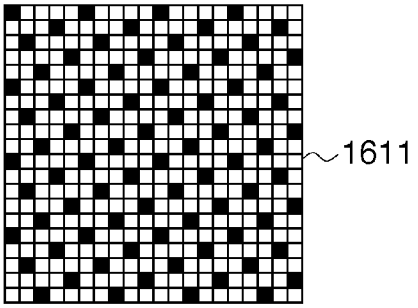
FIG. 16B
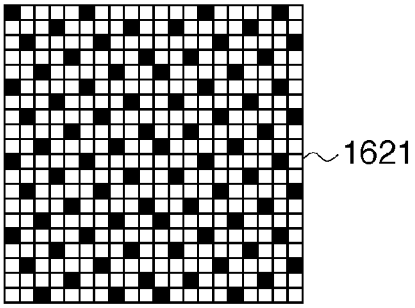
FIG. 16E
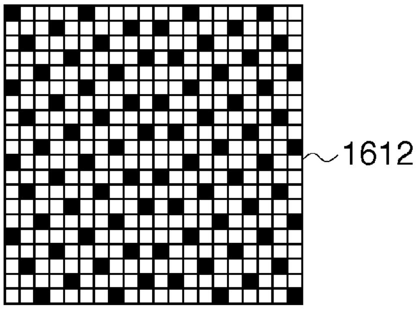
FIG. 16C
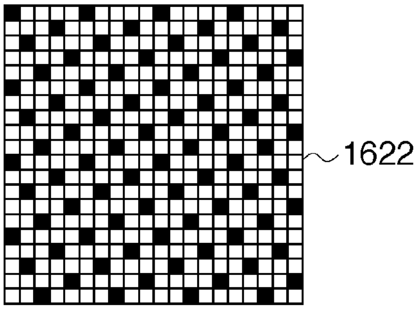
FIG. 16F
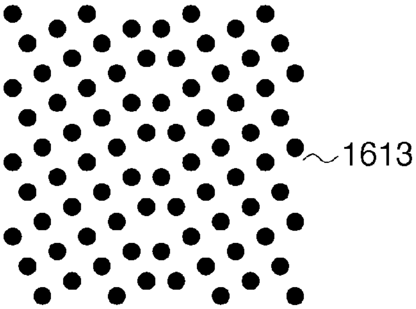
FIG. 16D
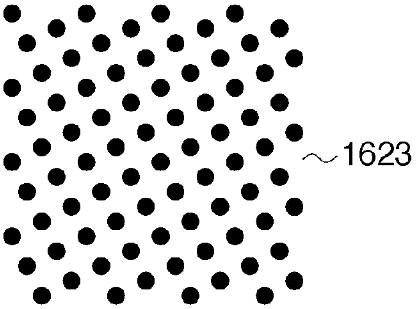
FIG. 16G

IMAGE FORMING APPARATUS AND IMAGE CORRECTION METHOD FOR CORRECTING SCAN-LINE POSITION ERROR

BACKGROUND OF THE INVENTION

1. Field of the Invention

The present invention relates to an image forming apparatus and image forming method and, more particularly, to an image forming apparatus and image correction method for reproducing an input image at a density for a stable quality in a laser beam printer (LBP), digital copying machine, or multifunction printer (MFP) using an electrophotographic process.

2. Description of the Related Art

As a kind of color image forming apparatus such as a printer or copying machine, there is known a tandem type color image forming apparatus, which comprises electrophotographic image forming units equal in number to color components and sequentially transfers toner images of respective color components onto a print medium by the image forming units. The image forming unit of each color includes a developing unit and photosensitive drum. It is known that the tandem type color image forming apparatus has a plurality of factors which cause a positional error (to be referred to as a registration error) between images of respective color components.

These factors include the unevenness and attaching positional error of the lens of a deflecting scanning unit including the optical system of a polygon mirror, fθ lens, and the like, and the mounting positional error of the deflecting scanning unit to the image forming apparatus main body. Owing to these positional errors, the scan line does not become a straight line parallel to the rotating shaft of the photosensitive drum, and inclines or skews. If the degree of inclination or skew of the scan line (to be referred to as the profile or shape of the scan line hereinafter) is different between colors, a registration error occurs.

The profile has different characteristics for respective image forming apparatuses, that is, printing engines, and for deflecting scanning units of respective colors. FIGS. 24A to 24D show examples of the profile. In FIGS. 24A to 24D, the abscissa axis represents a position in the main scanning direction in the image forming apparatus. A line 2411 expressed as a straight line in the main scanning direction represents the characteristic (profile) of an ideal scan line free from a skew. Curves 2401, 2402, 2403, and 2404 represent the profiles of respective colors, and show examples of the profiles of scan lines for cyan (to be referred to as C hereafter), magenta (to be referred to as M hereafter), yellow (to be referred to as Y hereafter), and black (to be referred to as K hereafter), respectively. The ordinate axis represents a shift amount in the sub-scanning direction from an ideal characteristic. As is apparent from FIGS. 24A to 24D, the curve of the profile is different between colors. When electrostatic latent images are formed on the photosensitive drums of image forming units corresponding to the respective colors, the profile difference appears as the registration error between image data of the respective colors.

As a measure against registration error, Japanese Patent Laid-Open No. 2002-116394 discloses a method of measuring the degree of skew of a scan line using an optical sensor in the process of assembling a deflecting scanning device, mechanically rotating the lens to adjust the skew of the scan line, and fixing the lens with an adhesive.

Japanese Patent Laid-Open No. 2003-241131 discloses a method of measuring the inclination of a scan line using an optical sensor in the process of mounting a deflecting scanning device into a color image forming apparatus main body, mechanically inclining the deflecting scanning device to adjust the inclination of the scan line, and then mounting the deflecting scanning device into the color image forming apparatus main body.

Japanese Patent Laid-Open No. 2004-170755 discloses a method of measuring the inclination and skew of a scan line using an optical sensor, correcting bitmap image data to cancel them, and forming the corrected image. That is, a shift of an actual scan line from an ideal scan line which is a straight line parallel on the surface of the photosensitive drum to the rotating shaft of the photosensitive drum is canceled by shifting image data by the same amount in an opposite direction. This method corrects image data, and thus does not require a mechanical adjustment member or adjustment step in assembly. This method can downsize a color image forming apparatus, and deal with registration error at a lower cost than those by methods disclosed in Japanese Patent Laid-Open Nos. 2002-116394 and 2003-241131. The electrical registration error correction is divided into correction of one pixel and that of less than one pixel. In correction of one pixel, pixels are shifted (offset) one by one in the sub-scanning direction in accordance with the inclination and skew correction amounts, as shown in FIGS. 25A to 25C. In the following description, a position where the pixel is offset will be called a scan line changing point, and the process to offset a pixel will be called a scan line changing process. In FIG. 25A, P1 to P5 are scan line changing points.

In FIG. 25A, a profile 2501 of a scan line is corrected. The profile 2501 may also be expressed by an array of the coordinate values of pixels on a scan line, but in FIG. 25A, is expressed by approximate straight lines divided for respective areas. The scan line changing point is a position in the main scanning direction where the profile is scanned in the main scanning direction and shifts by one pixel in the sub-scanning direction. In FIG. 25A, P1 to P5 are scan line changing points. At a scan line changing point serving as a boundary, dots after the scan line changing point are shifted by one line in a direction opposite to the shift of the profile in the sub-scanning direction. This process is executed by paying attention to each line. FIG. 25B shows an example of image data shifted in the sub-scanning direction at each scan line changing point. In FIG. 25B, each hatched portion 2511 is one line before the scan line changing process, that is, one line in original image data. As a result of the scan line changing process, each line shifts in a direction in which the shift of the profile in the sub-scanning direction is canceled. FIG. 25C shows an example of image data obtained in this manner. Each hatched portion is one line before correction. In image formation, corrected image data is formed for each line. For example, normal image formation proceeds in the order of a line 2521, line 2522, . . . . After image formation, a hatched portion which forms one line in image data before correction is formed on an ideal scan line which should be originally formed. However, the scan line changing process is done for each pixel, so a shift of less than one pixel still remains in the sub-scanning direction.

A shift of less than one pixel that cannot be completely corrected by the scan line changing process is corrected by adjusting the tone value of bitmap image data by preceding and succeeding pixels in the sub-scanning direction, as exemplified in FIGS. 26A to 26F. More specifically, when the characteristic represents an upward inclination, like a profile 2601 in FIG. 26A, bitmap image data before tone correction is corrected to a pixel array 2603 (shown in FIG. 26C) inclined in a direction (downward in this example) opposite to the inclination of the profile. FIG. 26B shows bitmap image data before correction. Image data 2602 is shifted by one pixel in the sub-scanning direction at scan line changing points P1 and P2, as shown in FIG. 26F. To make the image data 2602 close to the ideal image data 2603 after correction, tone correction is executed to smooth steps at the scan line changing points P1 and P2, as shown in FIG. 26D. FIG. 26D is a view schematically showing the densities of pixels by the width and intensity of a laser pulse for forming these pixels. After exposure, a latent image as shown in FIG. 26E is formed to smooth steps generated by the scan line changing process. According to this method, the image process can correct the registration error. Tone correction performed for smoothing after the scan line changing process will be called an interpolation process.

When the bitmap image remains as a halftone image, registration error correction can be done by this sequence in accordance with the profile of the image forming unit. However, the screen process sometimes degrades the image quality.

FIGS. 10A to 10C are views schematically showing a state in which the scan line changing process and interpolation process are performed for a halftone image reproduced by the screen process. Binary image data having undergone the screen process has a dot pattern (called a dither pattern) corresponding to the tone level owing to the locality meaning that pixels in a very small area have similar tone levels. The dot pattern is determined by the arrangement of the threshold matrix of a dither matrix. In some cases, the dot pattern is designed to have screen angles different between, for example, color components. In this example, binary image data after the screen process is expressed by four bits per pixel. That is, the pixel value after the screen process is 0 or 15.

If the scan line changing process is done for image data having undergone the screen process, the dither pattern of an output image shifts at a scan line changing point. For example, when an image 1001 shown in FIG. 10A is input, dots shift before and after a scan line changing point, as shown in FIG. 10B. As a result, the dither pattern shifts at the scan line changing point serving as a boundary. This shift is observed as a stripe running in the sub-scanning direction. This stripe degrades the image quality.

If the above-mentioned interpolation process is applied to image data after the screen process in addition to the scan line changing process, areas before and after the scan line changing point are reproduced at a density different from that of a peripheral area, generating density unevenness as shown in FIG. 10C.

If the screen process is performed using a dither matrix for image data after the scan line changing process, no dither pattern shifts and no image quality degrades. However, the scan line changing process requires a large-capacity memory. In order to execute the scan line changing process for unquantized image data without performing the screen process, line buffers equal in number to lines subjected to the scan line changing process are necessary. In addition, each pixel has a size before quantization. For this reason, a large-capacity memory is required.

SUMMARY OF THE INVENTION

The present invention has been made in consideration of the conventional situation, and has as its object to solve the above-described problems. More specifically, it is an object of the present invention to provide an image forming apparatus and image correction method capable of correcting, by the scan line changing process, a registration error caused by the profile difference between image forming units of respective color components, and preventing degradation of the image quality caused by a shift of the dither pattern, thereby obtaining a high-quality image with a small circuit arrangement.

It is another object of the present invention to provide an image forming apparatus and image correction method capable of preventing degradation of the image quality even if the rotation process is performed after the registration error correction process and screen process.

It is still another object of the present invention to provide an image forming apparatus and image correction method capable of preventing degradation of the image quality caused by a change of the screen angle upon rotation of an image.

To achieve the above objects, the present invention comprises the following arrangement. That is, an image forming apparatus which has, for each color component, image forming means for forming an image, and forms a color image by compositing images of respective color components, the apparatus comprises:

a screen processing unit configured to perform a screen process for dot image data to be processed by shifting a position of a dither matrix element in accordance with a shift amount of a scan line in a sub-scanning direction on an image carrier of the image forming means; and a registration error correction unit configured to shift, in the sub-scanning direction, a position of each pixel of the dot image data processed by the screen processing unit so as to cancel the shift amount of the scan line in the sub-scanning direction on the image carrier of the image forming means.

According to another aspect of the present invention, an image correction method in an image forming apparatus which has, for each color component, image forming means for forming an image, and forms a color image by compositing images of respective color components, the method comprises:

a screen processing step of performing a screen process for dot image data to be processed by shifting a position of a dither matrix element in accordance with a shift amount of a scan line in a sub-scanning direction on an image carrier of the image forming means; and a registration error correction step of shifting, in the sub-scanning direction, a position of each pixel of the dot image data processed in the screen processing step so as to cancel the shift amount of the scan line in the sub-scanning direction on the image carrier of the image forming means.

The present invention can correct a registration error caused by the profile difference between image forming units of respective color components, and prevent degradation of an image caused by correction, thereby obtaining a high-quality image with a small circuit arrangement.

Further features of the present invention will become apparent from the following description of exemplary embodiments (with reference to the attached drawings).

BRIEF DESCRIPTION OF THE DRAWINGS

FIGS. 6A to 6D are views showing examples of the weighting arrangement;

FIGS. 9A to 9D are views showing how to hold data of the profile characteristic;

FIGS. 16A to 16G are views showing an intermediate image and output result in a case where an image process according to the embodiment is performed for an input image, and those in a case where it is not performed;

DESCRIPTION OF THE EMBODIMENTS

First Embodiment

The first embodiment of the present invention will be described with reference to the accompanying drawings. In the first embodiment, a shift of an actual scan line from an ideal scan line which should be originally formed by scanning the surface of a photosensitive drum with a laser beam, that is, from a scan line parallel to the rotating shaft of the photosensitive drum is canceled by shifting dot image data by the same amount in an opposite direction. Image degradation such as unevenness generated upon registration error correction is prevented. In addition, image degradation caused by performing a dither process for dot image data after registration error correction is also prevented.

An example of the structure of a laser beam printer as an example of an image forming apparatus applicable as an embodiment of the present invention, and an image correction method executed by the laser printer will be explained. The embodiment is applicable not only to the laser beam printer, but also to another type of output apparatus such as an inkjet printer or MFP (Multi Function Printer/Multi Function Peripheral). However, a printer to which the present invention can be effectively applied is one which comprises image forming units for respective color components and therefore may suffer a registration error between images of the respective color components. The registration error may occur when the inkjet printer is a serial printer in which printheads for respective color components are mounted in independent carriages, or a line head printer in which printheads for respective color components are independently attachable. By applying the embodiment of the present invention to these printers, the image quality improves. However, a tandem type color laser printer is highly likely to have a difference in scan line profile between color components, so the embodiment will exemplify the tandem type color laser printer.

Image Forming Section of Tandem Color LBP

Figure 4:
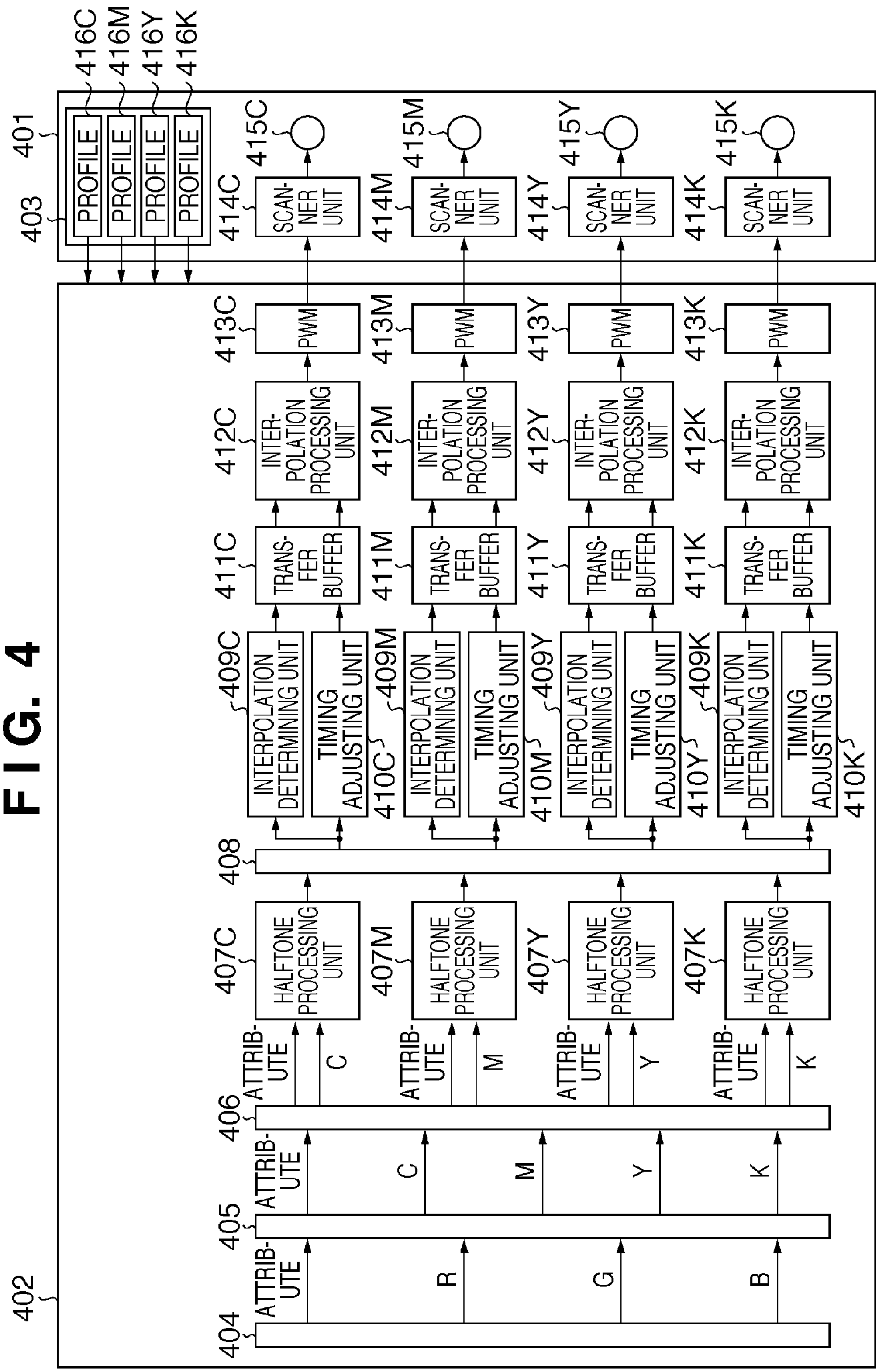
FIG. 4 is a block diagram of the arrangement of the color image forming apparatus.

FIG. 4 is a block diagram for explaining the arrangements of blocks associated with formation of an electrostatic latent image in an electrophotographic color image forming apparatus according to the first embodiment. The color image forming apparatus comprises a color image forming section 401 and image processing section 402. The image processing section 402 generates bitmap image information, and the color image forming section 401 forms an image on a print medium based on the bitmap image information. The image processing section 402 also performs a correction process such as registration error correction by referring to pieces of profile information 416C, 416M, 416Y, and 416K which are measured in advance and stored in a profile storage unit 403 for image forming units of respective color components. In the following description, building components denoted by reference numerals with color symbols "C", "M", "Y", and "K" for respective color components are sometimes generically named by reference numerals without these color symbols. The image forming unit is the name of a unit which includes a scanner unit 414 and printing unit 415 and forms a single-color image for each color component. The printing unit 415 is a unit which includes a photosensitive drum, transfer drum, and the like and forms a toner image. The printing unit 415 also forms images in addition to characters.

Figure 2:
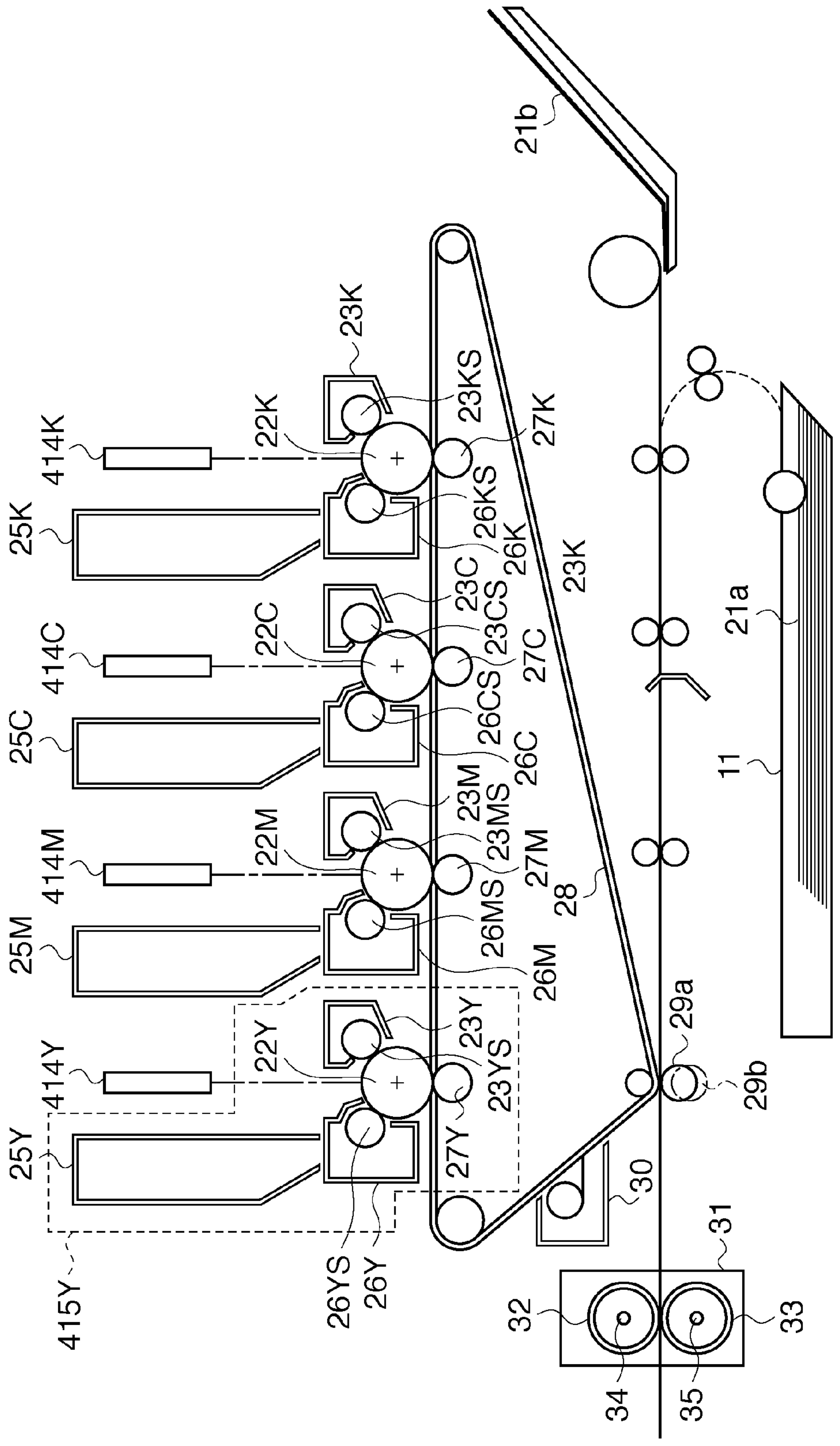
FIG. 2 is a sectional view of a tandem type color image forming apparatus adopting an intermediate transfer member.

FIG. 2 is a sectional view of the tandem type color image forming section 401 adopting an intermediate transfer member 28 as an example of the electrophotographic color image forming apparatus. The operation of the color image forming section 401 in the electrophotographic color image forming apparatus will be explained with reference to FIG. 2. The color image forming section 401 drives exposure light in accordance with an exposure time processed by the image processing section 402, forming an electrostatic latent image on the photosensitive drum, that is, image carrier. The color image forming section 401 develops the electrostatic latent image to form a single-color toner image of each color component. The color image forming section 401 composites single-color toner images on the intermediate transfer member 28 to form a multi-color toner image. The color image forming section 401 transfers the multi-color toner image to a print medium 11, and thermally fixes it. The intermediate transfer member also serves as an image carrier. The charging means comprises four injection chargers 23Y, 23M, 23C, and 23K for charging photosensitive bodies 22Y, 22M, 22C, and 22K for Y, M, C, and K. The injection chargers incorporate sleeves 23YS, 23MS, 23CS, and 23KS.

Driving motors rotate the image carriers, that is, photosensitive bodies (photosensitive drums) 22Y, 22M, 22C, and 22K counterclockwise in accordance with the image forming operation. The scanner units 414Y, 414M, 414C, and 414K serving as exposure means irradiate the photosensitive bodies 22Y, 22M, 22C, and 22K with exposure light, selectively exposing the surfaces of the photosensitive bodies 22Y, 22M, 22C, and 22K. As a result, electrostatic latent images are formed on the surfaces of the photosensitive bodies. Developing units 26Y, 26M, 26C, and 26K serving as developing means develop the electrostatic latent images with Y, M, C, and K toners supplied from toner cartridge 25Y, 25M, 25C, and 25K in order to visualize the electrostatic latent images. The developing units incorporate sleeves 26YS, 26MS, 26CS, and 26KS. Each developing unit 26 is detachable. Each scanner unit can express the tone of each pixel, for example, 16 tone levels in accordance with the width and intensity of a laser beam.

Primary transfer rollers 27Y, 27M, 27C, and 27K serving as transfer means press the intermediate transfer member 28 rotating clockwise against the photosensitive bodies 22Y, 22M, 22C, and 22K, transferring the toner images on the photosensitive bodies to the intermediate transfer member 28. A single-color toner image is efficiently transferred onto the intermediate transfer member 28 by applying a proper bias voltage to the primary transfer roller 27, and making the rotational speed of the photosensitive body 22 different from that of the intermediate transfer member 28. This transfer is called primary transfer.

A multi-color toner image obtained by compositing single-color toner images of stations (which mean the image forming units of the respective color components) is conveyed to a secondary transfer roller 29 as the intermediate transfer member 28 rotates. The multi-color toner image on the intermediate transfer member 28 is transferred onto the print medium 11 which is conveyed from a paper feed tray 21*a* and 21*b* to the secondary transfer roller 29 while being clamped. A proper bias voltage is applied to the secondary transfer roller 29 to electrostatically transfer the toner image. This transfer is called secondary transfer. While transferring the multi-color toner image onto the print medium 11, the secondary transfer roller 29 abuts against the print medium 11 at a position 29*a*, and moves apart from the print medium 11 to a position 29*b* after printing.

A fixing unit 31 comprises a fixing roller 32 for heating the print medium 11, and a press roller 33 for pressing the print medium 11 against the fixing roller 32, in order to fuse and fix, on the print medium 11, a multi-color toner image transferred on the print medium 11. The fixing roller 32 and press roller 33 are hollow and incorporate heaters 34 and 35, respectively. The fixing unit 31 conveys the print medium 11 bearing the multi-color toner image by the fixing roller 32 and press roller 33, and applies heat and a pressure to fix the toner to the print medium 11.

The toner-fixed print medium 11 is discharged by discharge rollers (not shown) onto a delivery tray (not shown), ending the image forming operation. A cleaning unit 30 cleans off toner left on the intermediate transfer member 28. Waste toner left after transferring four color toner images formed on the intermediate transfer member 28 to the print medium 11 is stored in a cleaner vessel. As described above, the tandem color LBP comprises the image forming units including the printing units 415 and scanner units 414 for the respective color components. In FIG. 2, regarding the scanner units 414, scanner units 414Y, 414M, 414C and 414K are shown for respective color components. Regarding the printing units 415, only printing unit 415Y for yellow is exemplarily illustrated.

Profile Characteristic of Scan Line

Figure 3A:
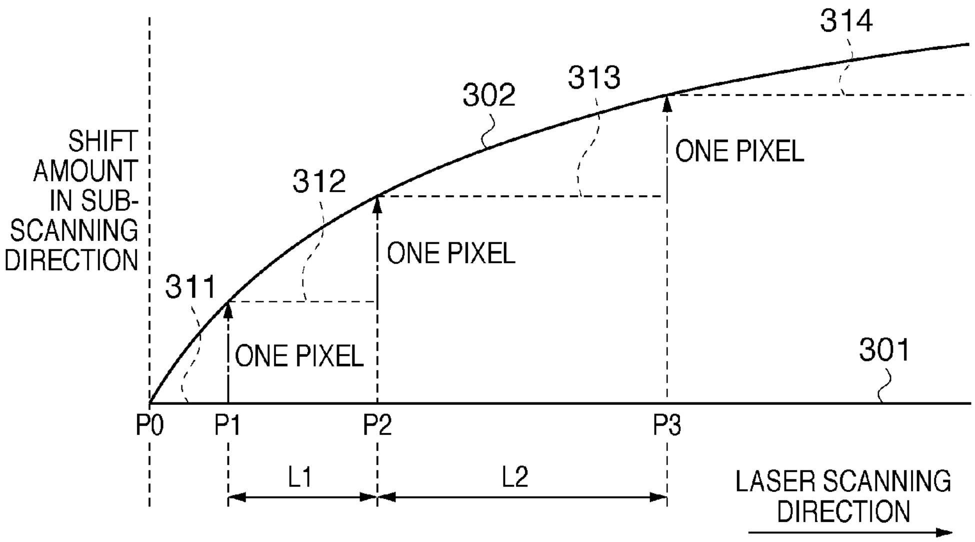
FIGS. 3A and 3B are graphs showing the profile characteristics of a scan line.
Figure 3B:
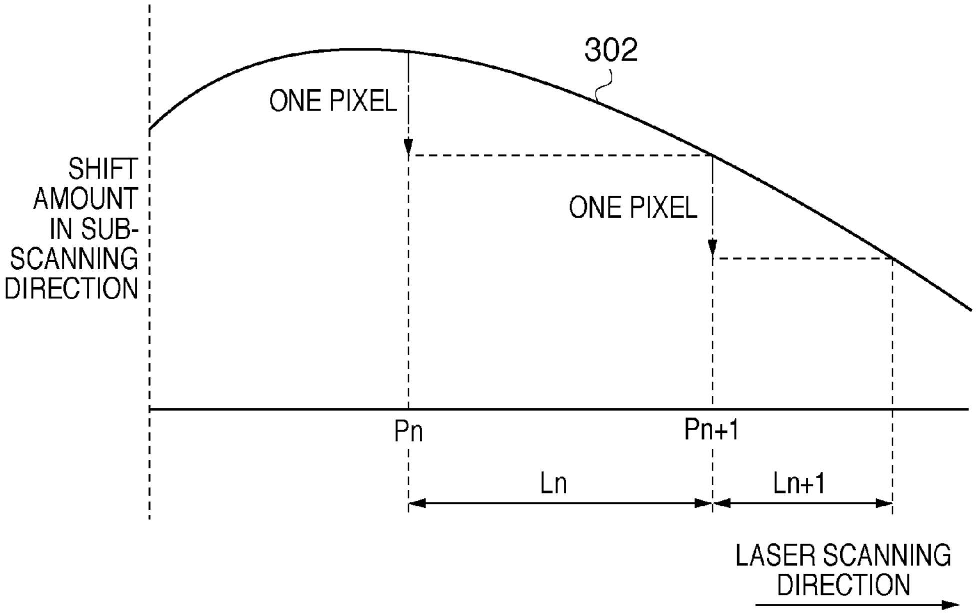

The profile characteristic of an actual scan line 302 for each color in the image forming apparatus will be explained with reference to FIGS. 3A and 3B. In FIGS. 3A and 3B, the scan line 302 represents an actual scan line which inclines or skews owing to the positional precision and eccentricity of the photosensitive body 22, and the positional precisions of the optical systems in the scanner units 414, that is, 414C, 414M, 414Y, and 414K shown in FIG. 2. The image forming apparatus has a different profile characteristic represented by the scan line 302 for each printing device (printing engine). The scan line 302 is frequently referred to as a profile 302 hereinafter. In a color image forming apparatus, the profile characteristic is different between colors.

FIG. 3A is a graph showing part of the profile characteristic of the image forming apparatus, and shows an area where the profile characteristic shifts upward in the sub-scanning direction. FIG. 3B shows an area where the profile characteristic shifts downward in the sub-scanning direction. An abscissa axis 301 represents an ideal scan line, and shows a characteristic when the photosensitive body 22 is scanned perpendicularly to the rotational direction of the photosensitive body 22, that is, scanned parallel to the rotating shaft. The profile is expressed by a graph in FIGS. 3A and 3B, but a profile held in the profile information 416 is discrete data. For example, every time an actual scan line moves apart from or close to an ideal scan line by one pixel from a scan line start position P0, the position and the moving direction representing whether the actual scan line moves apart from or close to an ideal scan line are stored in association with each other. The position suffices to specify the ordinal number of a pixel in the scan line direction. Hence, the profile 302 is approximated by line segments 311, 312, 313, and 314 in profile information, which is sufficient for registration error correction.

In the following description, the profile characteristic assumes a direction in which the image processing section 402 corrects the profile characteristic. However, this representation is merely an example, and any representation can be adopted as long as the shift amount and direction can be uniquely specified. For example, it is possible to define the profile characteristic as the shift direction in the color image forming section 401 and correct the characteristic in the opposite direction by the image processing section 402.

Figure 7A:
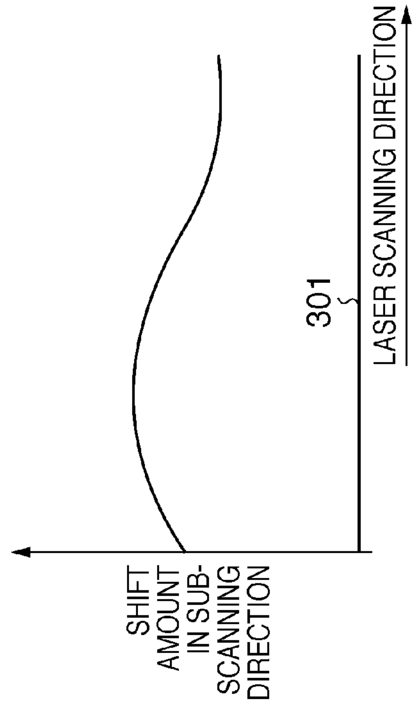
FIGS. 7A to 7D are graphs showing a direction in which correction should be done, and the shift direction.
Figure 7B:
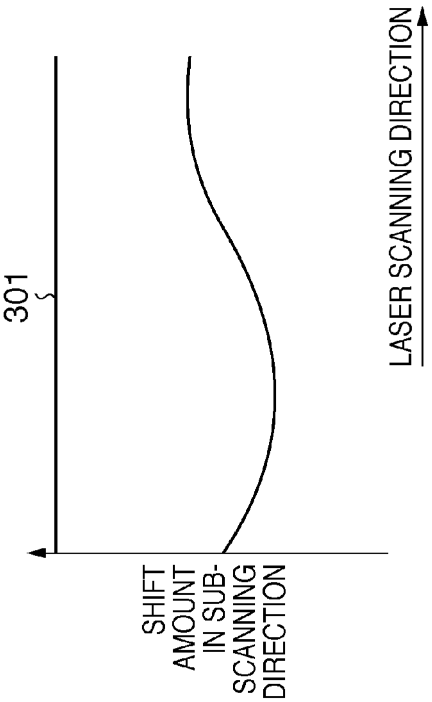
Figure 7C:
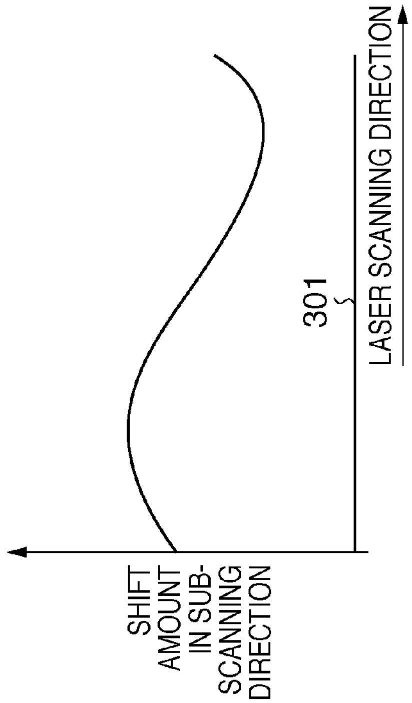
Figure 7D:
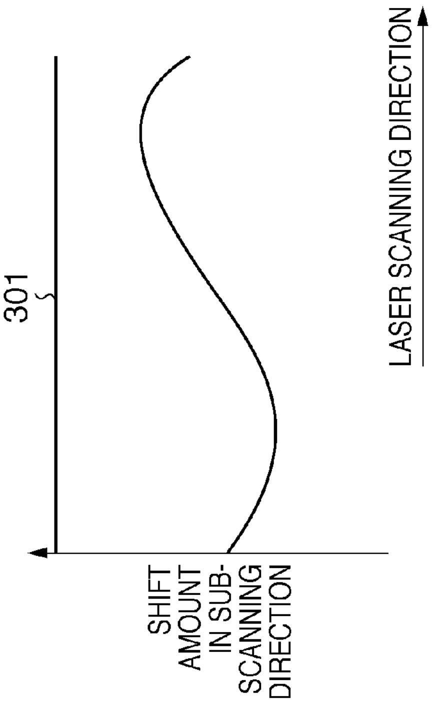

FIGS. 7A to 7D show the correlation between the direction in which the image processing section 402 performs correction, and the shift direction of the scan line in the color image forming section 401 on the basis of the profile definition. When the profile characteristic of the color image forming section 401 is given as shown in FIG. 7A, the image processing section 402 shifts image data in an opposite direction in the sub-scanning direction, as shown in FIG. 7B. When the profile characteristic of the color image forming section 401 is given as shown in FIG. 7C, the image processing section 402 shifts image data in the sub-scanning direction, as shown in FIG. 7D. Note that the shift amount is measured using the ideal scan line 301 as a reference.

Profile characteristic data (profile information) includes the pixel position of a scan line changing point in the main scanning direction, and the direction of change of the scan line to the next scan line changing point, as shown in FIG. 9B. More specifically, scan line changing points P1, P2, P3, . . . , Pm are defined for the profile characteristic in FIG. 9A. Each scan line changing point is defined as a point where the scan line shifts by one pixel in the sub-scanning direction. As the direction, the scan line shifts upward or downward in a section till the next scan line changing point. For example, at the scan line changing point P2, the scan line shifts upward by one line in FIG. 9A. That is, at the scan line changing point P2, image data changes to a line immediately below the current line. The shift direction at the point P2 is "upward (↑)", as shown in FIG. 9B. In the image process, image data changes to a lower line. Similarly at the point P3, the shift direction is "upward (↑)". The shift direction in the sub-scanning direction at the scan line changing point P4 is "downward (↓)", unlike the preceding direction. Data on the direction is held as, for example, "1" representing the upward direction, or "0" representing the downward direction, as shown in FIG. 9C. In this case, the amount of held data corresponds to bits equal in number to scan line changing points. If the number of scan line changing points is m, the number of held bits is also m. Further, a bit string representing shifted lines may also be held as shown in FIG. 9D, instead of holding the positions of scan line changing points. FIG. 9D shows a phase offset table (to be described later), and shows the cumulative number of shifted lines (one line in this example) in the shift direction at each scan line changing point. An upward shift of the profile in FIG. 9A is given by a positive value, a downward shift is given by a negative value, and these values are added. That is, FIG. 9D shows the relative line number of a line to which the line of interest changes in the scan line changing process when the input line number is 0. In FIG. 9D, the sign is opposite to that of the scan line changing process, and is the same as that of the profile characteristic.

Scan Line Changing Point

The scan line changing point of an area where the scan line shifts upward in the laser scanning direction will be explained with reference to FIG. 3A. The scan line changing point in the embodiment is a point where the scan line shifts by one pixel in the sub-scanning direction. In FIG. 3A, points P1, P2, and P3 where the upward skew characteristic 302 shifts by one pixel in the sub-scanning direction are scan line changing points. In FIG. 3A, the points P1, P2, and P3 are plotted using P0 as a reference. As is apparent from FIG. 3A, the distance between scan line changing points is short in an area where the skew characteristic 302 changes abruptly, and long in an area where it changes gradually, as represented by distances L1 and L2.

The scan line changing point of an area where the scan line shifts downward in the laser scanning direction will be explained with reference to FIG. 3B. Also in an area representing a downwardly shifted characteristic, the scan line changing point is defined as a point where the scan line shifts by one pixel in the sub-scanning direction. In FIG. 3B, points Pn and Pn+1 where the downward skew characteristic 302 shifts by one pixel in the sub-scanning direction are scan line changing points. Also in FIG. 3B, similar to FIG. 3A, the distance between scan line changing points is short in an area where the skew characteristic 302 changes abruptly, and long in an area where it changes gradually, as represented by distances Ln and Ln+1.

As described above, the scan line changing point is closely related to the degree of change of the skew characteristic 302 of the image forming apparatus. The number of scan line changing points is large in an image forming apparatus having a steep skew characteristic, and small in an image forming apparatus having a gradual skew characteristic.

If the skew characteristic of the image forming unit is different between colors, the number and positions of scan line changing points are also different. The difference in scan line profile between colors appears as a registration error in an image obtained by transferring toner images of all colors onto the intermediate transfer member 28. The present invention is directed to a process at the scan line changing point.

Image Processing Section of Tandem Color LBP

Figure 1:
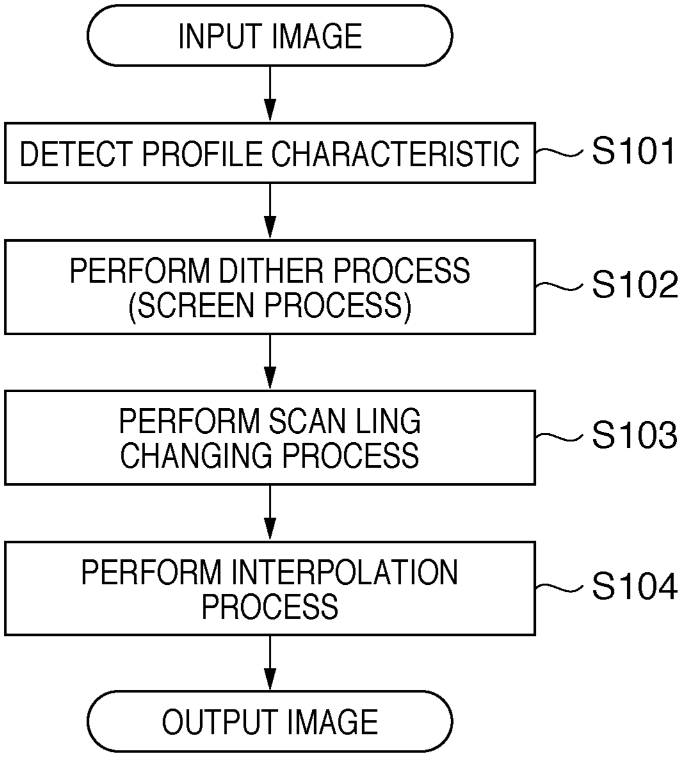
FIG. 1 is a flowchart showing the process of an image processing apparatus according to the present invention.

The image processing section 402 in the color image forming apparatus will be explained with reference to FIGS. 1 and 4. FIG. 1 shows an outline of the process. First, profile characteristic information is detected (or stored profile characteristic information is read out) (S101), and the dither process (screen process) is performed using a phase offset table corresponding to the profile characteristic information (S102). Then, the scan line changing process (S103) and the interpolation process (S104) are performed. The processed dot image data is transmitted to the color image forming section and printed. Details of this process will be explained below.

An image generation unit 404 generates raster image data capable of a printing process from print data received from a computer or the like (not shown), and outputs the raster image data for each pixel as R, G, and B data and attribute data representing the data attribute of each pixel. The image generation unit 404 may also be configured to arrange a reading means in the color image forming apparatus and process image data from the reading means instead of image data received from a computer or the like. A color conversion unit 405 converts R, G, and B data into C, M, Y, and K data in accordance with the toner colors of the color image forming section 401, and stores the C, M, Y, and K data and attribute data in a storage unit 406. The storage unit 406 is the first storage unit arranged in the image processing section 402, and temporarily stores dot image data subjected to a printing process. The storage unit 406 may also be formed from a page memory which stores dot image data of one page, or a band memory which stores data of lines. Dot image data is also called raster image data.

Halftone processing units 407C, 407M, 407Y, and 407K perform a halftone process for attribute data and data of the respective colors output from the storage unit 406. As concrete arrangements of the halftone processing unit, there are a halftone processing unit which performs a screen process, and a halftone processing unit which performs an error diffusion process. The screen process is to perform an N-ary process using predetermined dither matrices and input image data. The error diffusion process is to perform an N-ary process by comparing input image data with a predetermined threshold, and diffuse the difference between the input image data and the threshold to peripheral pixels subjected to the N-ary process later. The first embodiment executes the error diffusion process. In the first embodiment, N=2, but the number of bits per pixel is four. That is, a pixel value is converted into 0 or 15 by a quantization process.

A second storage unit 408 is incorporated in the image forming apparatus, and stores N-ary data processed by the halftone processing units 407, that is, 407C, 407M, 407Y, and 407K. If the position of a pixel subjected to an image process by processing blocks on the downstream side of the second storage unit 408 is a scan line changing point, scan line changing of one line is executed when reading out data from the second storage unit 408. More specifically, the address of a dot to be read out proceeds not to the next dot but further by one line from the next dot, or returns by one line. Whether to proceed or return the address by one line is determined in accordance with the shift direction.

Figure 8A:
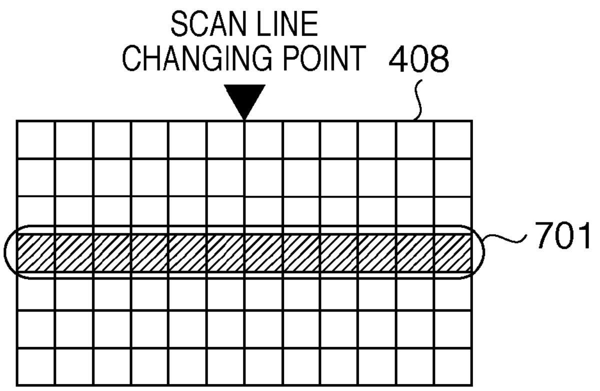
FIGS. 8A to 8C are views showing a registration error and a scan line changing process.
Figure 8B:
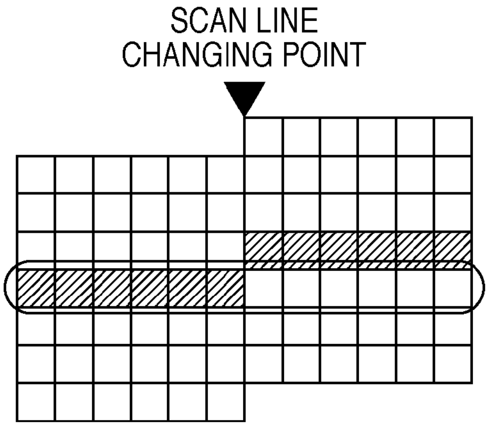
Figure 8C:
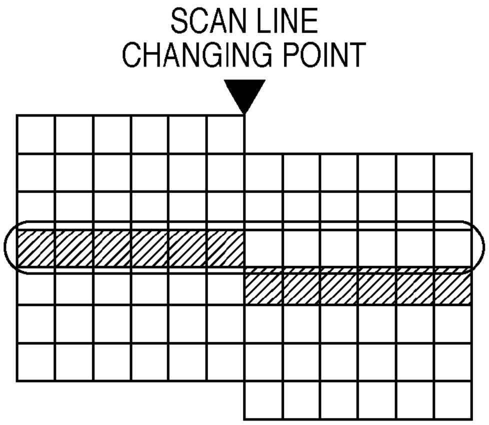
Figure 10A:
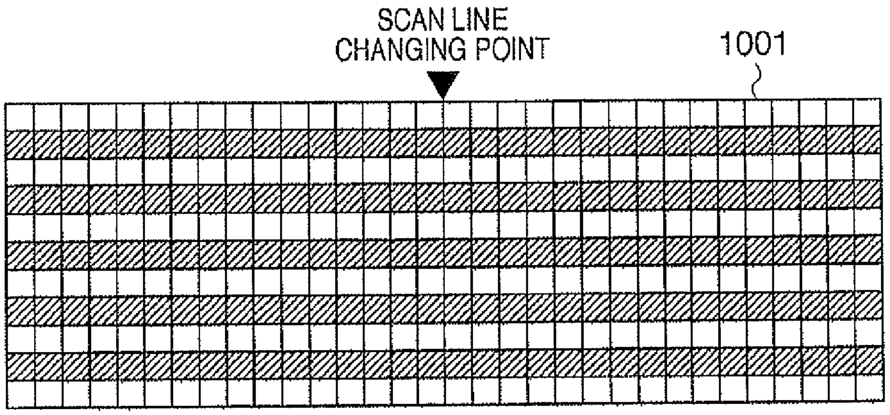
PRIOR ART FIG. 10A
FIGS. 10A to 10C are views showing a state in which the scan line changing process and interpolation process are performed for a halftone image based on a screen having undergone the scan line changing process.
Figure 10B:
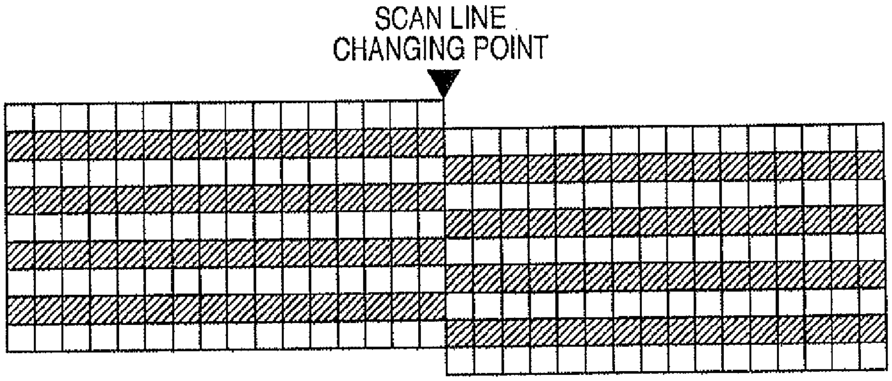
Figure 10C:
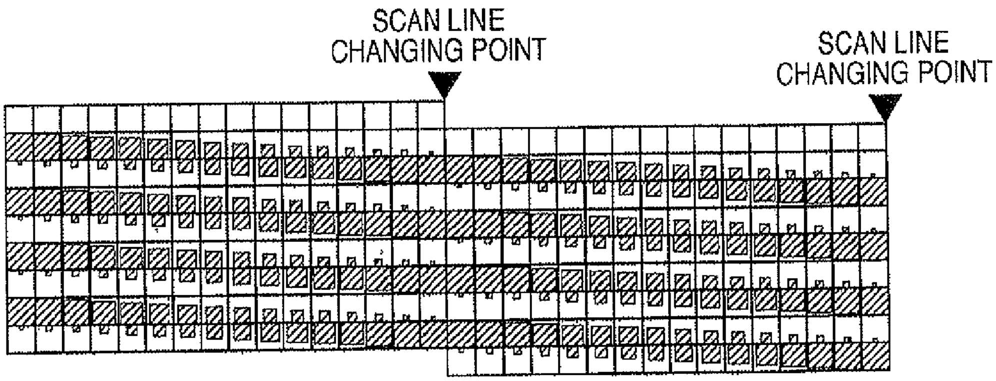

FIG. 8A is a view schematically showing the state of data held in the storage unit 408 of FIG. 4. As shown in FIG. 8A, the storage unit 408 stores data processed by the halftone processing unit 407 regardless of the correction direction of the image processing section 402 or the skew characteristic of the scan line in the color image forming section 401. If the direction in which the image processing section 402 performs correction is downward, that is, the profile characteristic is downward, image data is shifted upward by one pixel at a scan line changing point serving as a boundary, as shown in FIG. 8B, when reading out a line 701 in FIG. 8A. If the direction in which the image processing section 402 performs correction is upward, that is, the profile characteristic is upward, image data is shifted downward by one pixel at a scan line changing point serving as a boundary, as shown in FIG. 8C, when reading out image data of the line 701 from the storage unit 408.

Interpolation determining units 409C, 409M, 409Y, and 409K for the respective colors determine whether or not the pixel requires interpolation later as a process for pixels before and after a scan line changing point in input N-ary data. Timing adjusting units 410C, 410M, 410Y, and 410K synchronize N-ary data read out from the storage unit 408 with the determination results of the interpolation determining units 409. Transfer buffers 411C, 411M, 411Y, and 411K temporarily hold data output from the interpolation determining units 409 and timing adjusting units 410. In this description, the first storage unit 406, second storage unit 408, and transfer buffer 411 are separately arranged, but a common storage unit may also be arranged in the image forming apparatus.

Interpolation processing units 412C, 412M, 412Y, and 412K interpolate data received from the transfer buffers 411 based on the determination results of the interpolation determining units 409 that are also transferred from the transfer buffers. Although the determination result from the interpolation determining unit 409 is the result of determination of each pixel, the interpolation process by the interpolation processing unit 412 uses pixels before and after a scan line changing point corresponding to the profile (skew characteristic) of the image forming apparatus. FIGS. 5A to 5G show an interpolation method at a scan line changing point (FIGS. 5A to 5G will be referred to as FIG. 5 at once).

Interpolation Process

Figure 5A:
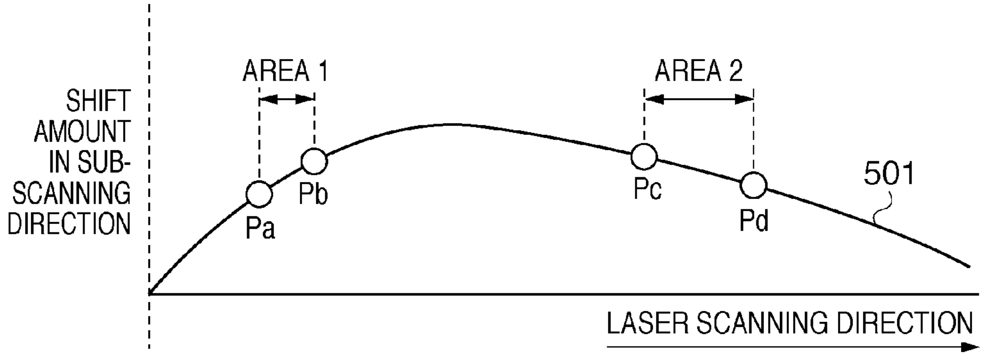
FIGS. 5A to 5G are views showing an interpolation method at a scan line changing point.

FIG. 5A is a graph showing the skew characteristic of the scan line of the image forming apparatus in the laser scanning direction. Area 1 is an area where the image processing section 402 needs to perform correction downward. To the contrary, area 2 is an area where the image processing section 402 needs to perform correction upward. For descriptive convenience, the minimum interval between scan line changing points is 16 pixels in the following description of the interpolation process, but the present invention is not limited to this. The interval may also be set to an arbitrary number of pixels, or the power of two in order to reduce the circuit arrangement. Interpolation, that is, smoothing to be described later is done for 16 pixels immediately before a scan line changing point in the main scanning direction. If the interval between scan line changing points is longer than 16 pixels, pixels preceding to (on the left side in FIG. 5A) the smoothed area remain without being smoothed. The interval is set to 16 pixels because one binary pixel is represented by four bits in this example and can also be represented by 16 tone levels in accordance with the tone expression capability of the image forming unit. A step between lines can be smoothed by changing the density by one tone level for one pixel value.

Figure 5B:
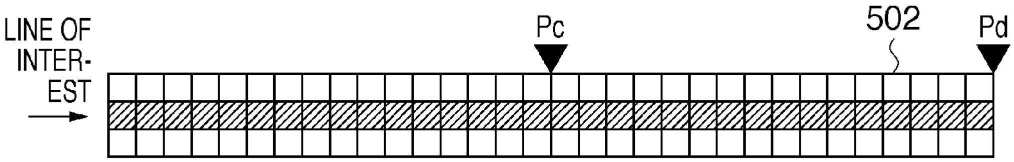
Figure 5C:
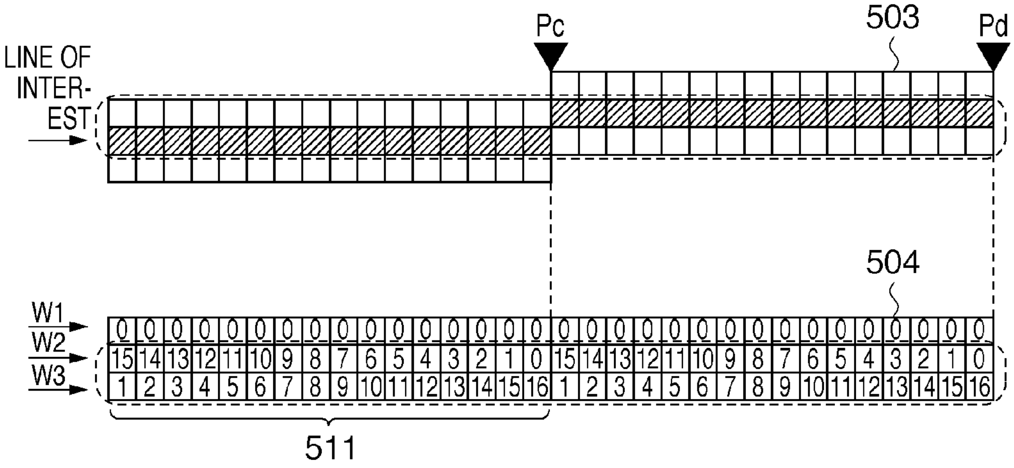

FIG. 5B shows images before and after a scan line changing point Pc before the scan line changing process, that is, shows output image data 502 from the halftone processing unit 407 in the example of FIGS. 5A to 5G. The line of interest is the center line of 3-line image data shown in FIG. 5B. FIG. 5C shows the arrangement of data 503 after the scan line changing process of one pixel when paying attention to the line of interest, that is, the arrangement of image data output from the storage unit 408. Since the scan line changing process is performed when reading out image data from the storage unit 408, the arrangement of pixels before and after the scan line changing point Pc when inputting image data to the interpolation processing unit 412 has a step of one line at the scan line changing point Pc serving as a boundary.

The interpolation processing unit 412 executes the interpolation process for image data appearing as a step on the line of interest. Since the correction direction in area 1 is upward, the line of interest is interpolated by weighting image data of a succeeding line. Weighting in this description is to adjust the sum of two target pixels in the sub-scanning direction to 16 in accordance with the minimum value of the scan line changing point, as shown in FIG. 5C. However, this is merely an example, and the sum of pixel values is not limited to 16. The sum of pixel values may also be set to the power of two in order to reduce the circuit used for calculation, or an arbitrary coefficient may also be used for calculation in order to increase the precision. As the weighting calculation, the weighting coefficient may also be changed for each pixel, which will be described later. Alternatively, a common weighting coefficient may also be used for a plurality of pixels, as shown in FIGS. 6A to 6D. Further, the number of corresponding pixels may also be changed depending on the value of the weighting coefficient. The scan line changing point is defined as a position on the main scan line where the scan line shifts by one pixel in the sub-scanning direction. In the following description, the reference position in interpolation is set to the start point of main scanning, that is, the left end. Equation (1) is used for interpolation, wherein x represents the position of the pixel of interest in the main scanning direction, and y represents the position of the pixel of interest in the sub-scanning direction. Letting p be a pixel value and p' be a corrected pixel value, equation (1) is $$p'(x,y)=w1\times p(x,y-1)+w2\times p(x,y)+w3\times p(x,y+1) \quad (1)$$

where w1, w2, and w3 are weighting coefficients having the same x-coordinate and are defined by a coefficient matrix of 3×16 pixels in this example, as shown in FIG. 5C. The coefficient matrix in FIG. 5C is used to shift image data to an upper line at a scan line changing point. All coefficients on a line immediately above the line of interest are 0. The coefficient value on the line of interest (center line in FIG. 5C) is decremented by $1/16$ from $15/16$ to $0/16$ (the denominator is not shown in FIG. 5C) every time the pixel of interest moves to the right by one pixel. The coefficient value on a line immediately below the line of interest is incremented by $1/16$ from $1/16$ to $16/16$ every time the pixel of interest moves to the right by one pixel. This coefficient matrix corresponds to 3×16 pixels centered on the line of interest immediately before (on the right side) the scan line changing point, and corrected pixel values are obtained in accordance with equation (1). The corrected pixel values replace pixel values before correction. This process is done by paying attention to all lines of image data to be processed. Equation (1) represents the value of the pixel of interest by the weighted average of the value of the pixel of interest and the values of corresponding pixels on upper and lower lines.

Figure 5D:
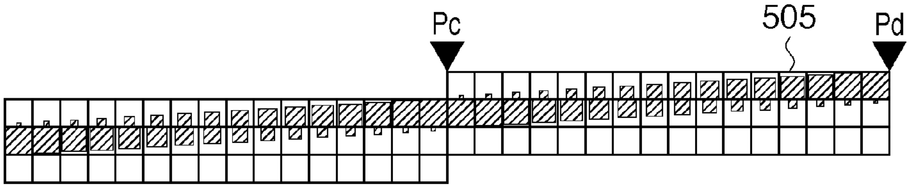

FIG. 5D is a conceptual view of interpolated pixel values obtained by applying equation (1) to image data in FIG. 5B. As for pixels before the scan line changing point Pc, as the pixel is closer to the scan line changing point Pc, it is more strongly influenced by a pixel value on a succeeding line by the interpolation of equation (1). As the pixel (pixel on the left side) is farther from the scan line changing point Pc, it is more strongly influenced by the line of interest, that is, black data line.

As for pixels after the scan line changing point Pc, as the pixel is closer to the scan line changing point Pc, it is more strongly influenced by image data on a line preceding to the line of interest. As the pixel is farther from the scan line changing point Pc, it is more strongly influenced by a line succeeding to the line of interest. The line preceding to the line of interest is a previous line of interest which becomes a preceding line of data owing to a scan line changing process step larger than one pixel. In this example, pixels other than 16 pixels immediately before the scan line changing point do not undergo the interpolation process, so their image data are not smoothed.

Area 1 where correction needs to be performed downward will be explained. When performing correction downward, weighting coefficients used to calculate corrected pixel values are set on the line of interest and a line preceding to it.

Figure 5E:
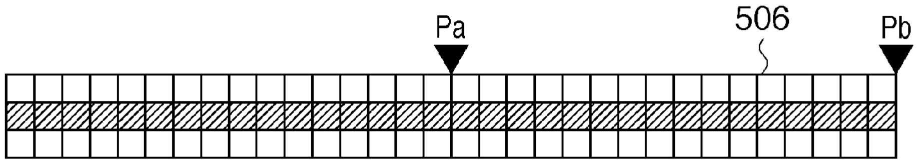
Figure 5F:
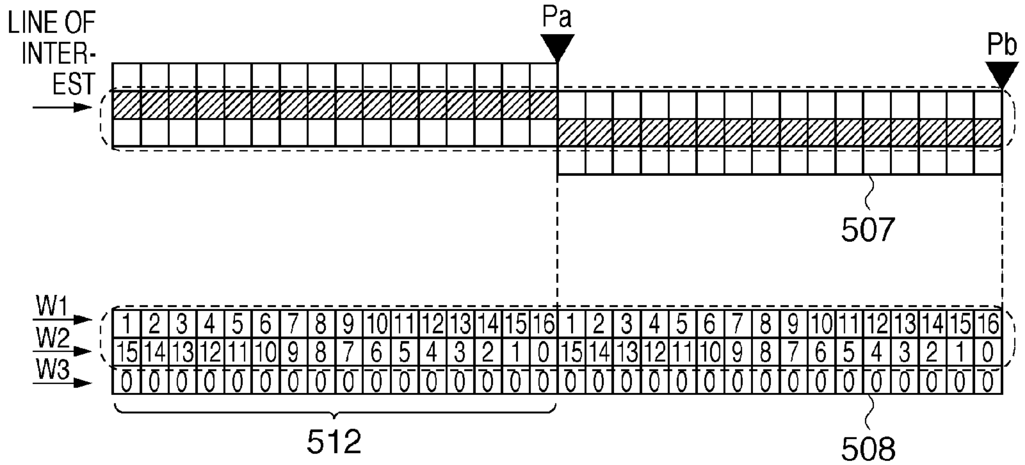
Figure 5G:
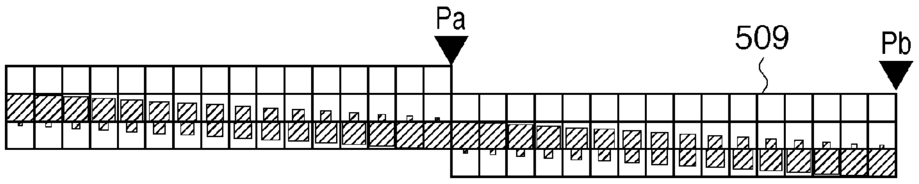

FIG. 5E shows image data output from the halftone processing unit 407. FIG. 5F shows an example of image data read out from the storage unit 408. Since downward correction is done at a scan line changing point Pa, a scan line changing process step larger than one pixel appears at the scan line changing point Pa serving as a boundary, as shown in FIG. 5F. The values W1, W2, and W3 when performing downward correction are those shown in FIG. 5F. For descriptive convenience, the sum of weighting coefficients is set to 16, similar to the upward correction process. By applying equation (1) to even downward correction, corrected pixel values are obtained using the scan line changing point Pa as a boundary. Before the scan line changing point Pa, as the pixel is closer to the scan line changing point, it is more strongly influenced by a pixel value on a preceding line. As the pixel is farther from the scan line changing point Pa, it is more strongly influenced by the line of interest. As for pixels after the scan line changing point Pa, as the pixel is closer to the scan line changing point Pa, it is more strongly influenced by the line of interest. As the pixel is farther from the scan line changing point Pa, it is more strongly influenced by a line preceding to the line of interest (FIG. 5G). In this example, the interpolation process targets 16 pixels before the scan line changing point. In FIG. 5G, the interval between the scan line changing points Pa and Pb is 16 pixels, so image data seem to be smoothed before and after the scan line changing point Pa. However, when the interval is larger than 16 pixels, image data are not smoothed immediately after the scan line changing point Pa.

In this way, a large step is prevented from appearing in pixel data successive in the main scanning direction owing to a scan line changing process step larger than one pixel in the interpolation process by the interpolation processing unit 412 regardless of whether the correction direction is upward or downward.

PWMs (Pulse Width Modulators) 413C, 413M, 413Y, and 413K convert image data of the respective colors output from the interpolation processing units 412C, 412M, 412Y, and 412K into the exposure times of the scanner units 414C, 414M, 414Y, and 414K. The printing units 415C, 415M, 415Y, and 415K of the image forming section 401 output the converted image data. Profile characteristic data are held in the image forming section 401 as the characteristics of the image forming apparatus (the profiles 416C, 416M, 416Y, and 416K). The image processing section 402 executes a scan line changing process and interpolation process in accordance with the profile characteristics held in the image forming section 401.

Screen Process

The most characteristic part of the present invention will be described in more detail with reference to the accompanying drawings. As described above, an electrophotographic image forming apparatus reproduces an image by a halftone process such as a screen process. However, if the registration error correction process, particularly the scan line changing process is directly executed for a halftone image having undergone the screen process, a phase mismatch of the dither pattern occurs before and after a scan line changing point. To prevent this, the halftone processing unit 407 executes a process (to be referred to as a phase offset process hereinafter) to offset the phase of the dither pattern in advance in a direction opposite to that of the scan line changing process by referring to a scan line changing point set in accordance with each of profile characteristics 416C, 416M, 416Y and 416K.

A screen process including the phase offset process by the halftone processing unit 407 will be explained. FIGS. 11A to 11D schematically show a state in which the halftone processing unit 407 performs the screen process and phase offset process for an image input from the storage unit 406. The phase offset process is unique to the embodiment. A process to offset the dither matrix in advance so as to return the screen to an original pattern by the scan line changing process when performing the screen process prior to the scan line changing process will be called the phase offset process.

Figure 11A:
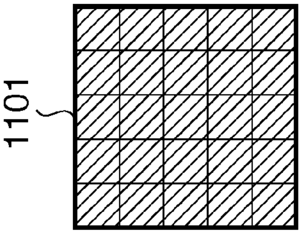
FIGS. 11A to 11D are views showing a state in which the screen process and phase offset process are performed for an input image.
Figure 11B:
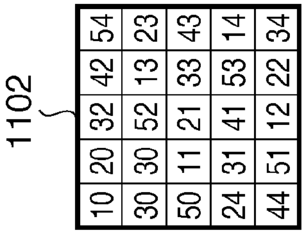
Figure 11C:
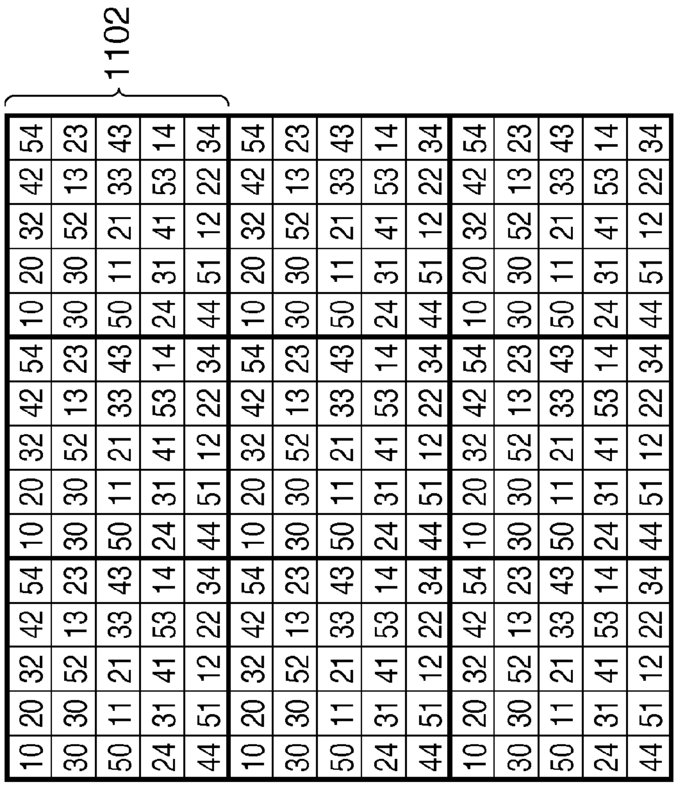
Figure 11D:
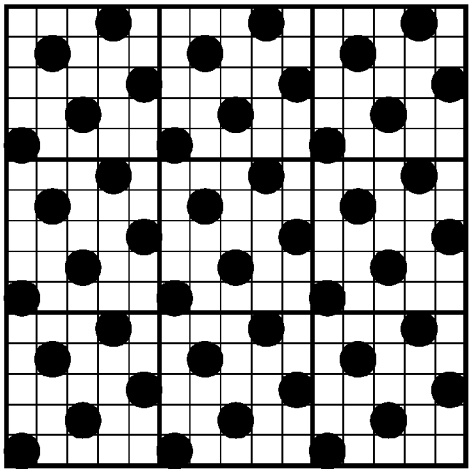
Figure 12:
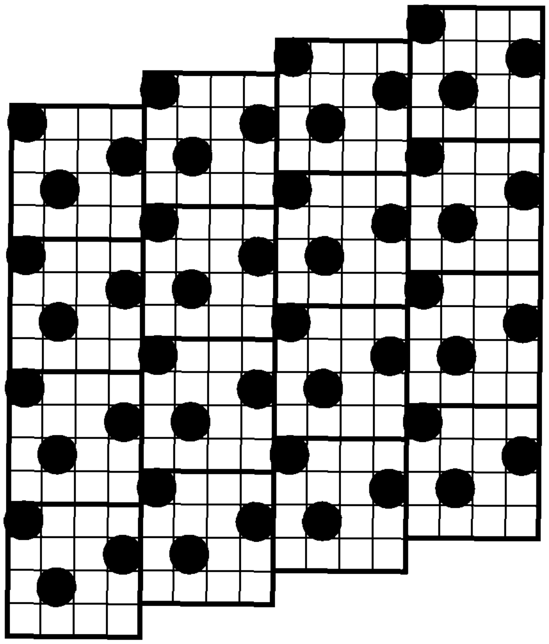
FIG. 12 is a view showing an example of the array of dither matrices shifted in the sub-scanning direction every several lines.

The screen process will be explained first. FIG. 11A shows an image 1101 input from the storage unit 406 to the halftone processing unit 407. Since an electrophotographic image forming apparatus is generally a binary printer, the intermediate density is expressed by the area ratio of output paper and toner in a region obtained by dividing an image into small-area regions. This is so-called area coverage modulation. To obtain the area of color in each region, a submatrix called a dither matrix exemplified in FIG. 11C is prepared. The dither matrix has a threshold at a portion corresponding to each pixel with the same shape and area as those of a region serving as the unit of tone expression. For descriptive convenience, one type of dither matrix is used, but the halftone processing units 407C, 407M, 407Y, and 407K may also hold dither matrices that are different between the respective colors. Dither matrices are arrayed in a lattice, as shown in FIG. 11C, and superposed on an input image. The pixel value of the input image is compared with the threshold of the dither matrix for each pixel. It is determined from the magnitude relation whether to color the target pixel. As a result, an image having undergone the screen process as shown in FIG. 11D is obtained. In an actual process, a pixel input in the raster scanning order is compared with a threshold at a corresponding position in the dither matrix, and is binarized. However, this process intuitively seems to be one shown in FIG. 11C. In the following description, therefore, dot image data is rasterized in this way, dither matrices are arrayed, and a pixel is compared with a corresponding threshold and binarized. Note that the dither matrix array pattern is not limited to a square lattice, and includes the array of dither matrices staggered in the sub-scanning direction every several lines, as shown in FIG. 12.

Figure 13:
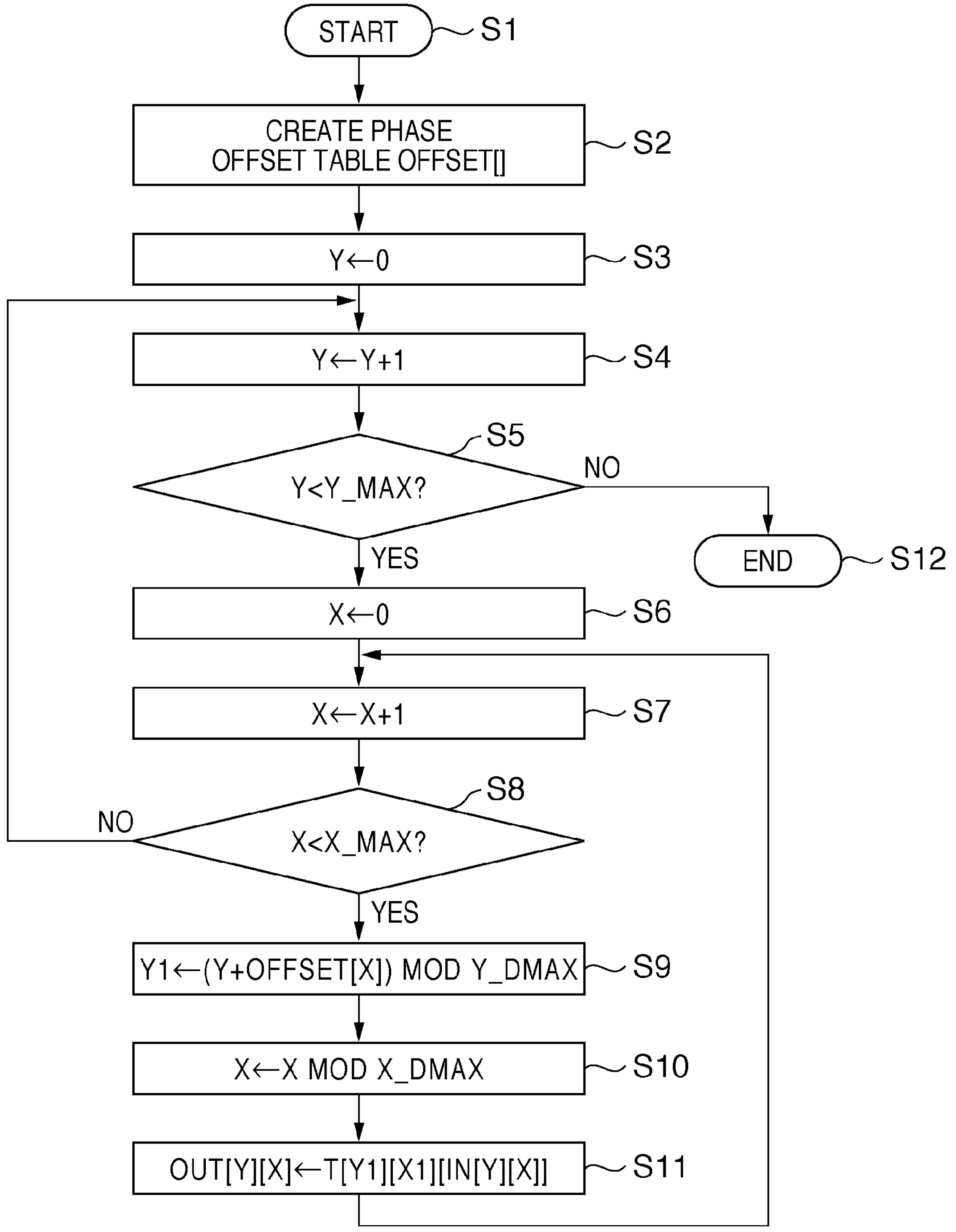
FIG. 13 is a flowchart of a screen process including a phase offset process in the first embodiment.
Figure 14:
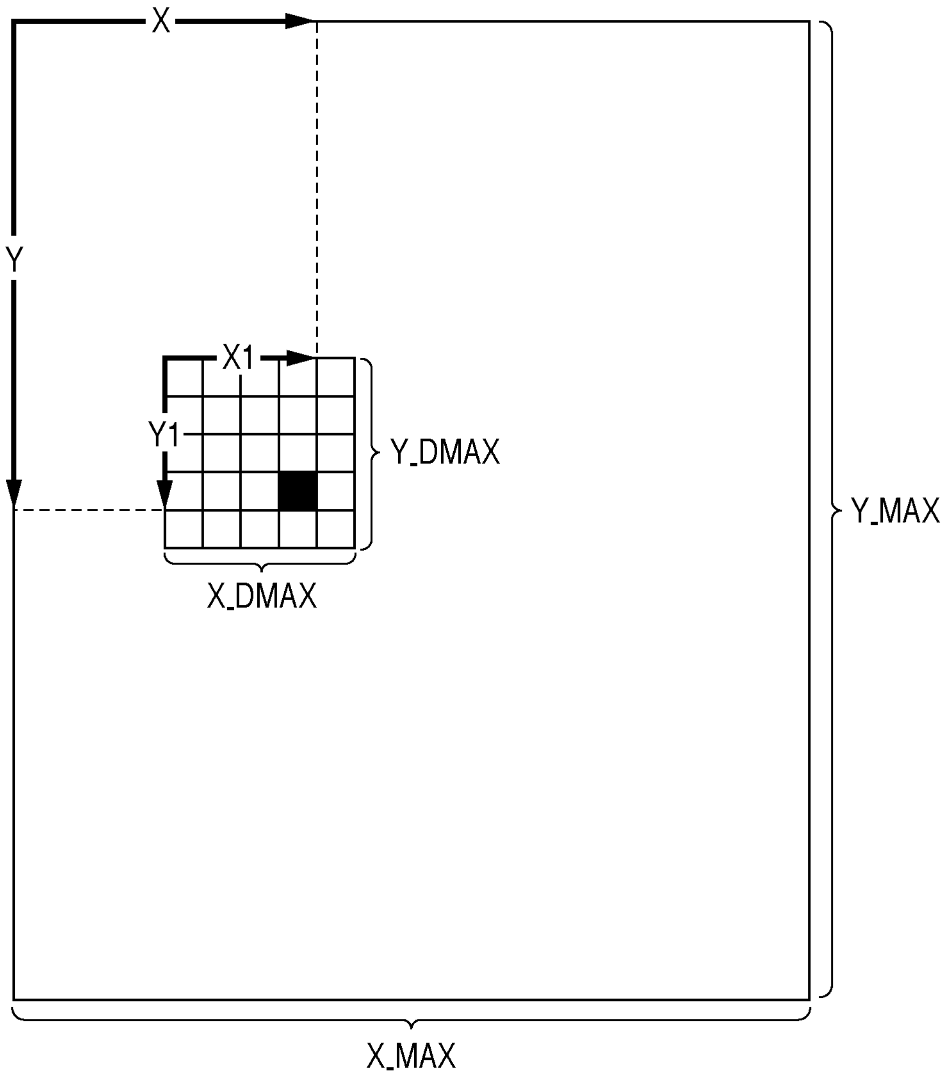
FIG. 14 is a view showing the relationship between an input image and a dither matrix.

FIG. 13 is a flowchart of the screen process including the phase offset process in the halftone processing unit 407. FIG. 14 is a schematic view showing the relationship between an input image and a dither matrix. (X,Y) represent the coordinates of a given pixel of an input image, (X1,Y1) represent the those of the pixel in a dither table, IN[X][Y] represents an input pixel value, and OUT[X][Y] represents an output pixel value. The coordinates (X1,Y1) can be rewritten into the coordinates of a threshold element in the dither matrix that corresponds to a pixel at the coordinates (X,Y). X_MAX represents the width of the input image in the main scanning direction, and Y_MAX represents the width of the input image in the sub-scanning direction. X_DMAX represents the width of the dither table in the main scanning direction, and Y_DMAX represents the width of the dither table in the sub-scanning direction. T[X1] [Y1] represents an element in the dither table, and OFFSET[X] represents a phase offset table. In general, the origin of the coordinates of a pixel is set to the upper left corner, and is represented by coordinates (0,0). However, in the flowcharts of FIG. 13 and the like in the embodiment, the origin is set to (1,1), and the diagonal point is set to (X_MAX,Y_MAX). This is not essential, and is merely an example.

In S2 of FIG. 13, the phase offset table OFFSET[X] is created by referring to the profile characteristic. This table depends on the X-coordinate of a pixel in the main scanning direction that is obtained from the profile characteristic. The phase offset table represents an offset by which the phase of the dither pattern is offset in a direction opposite to the scan line changing process. FIG. 9D shows an example of the phase offset table. The phase offset table sets values to return the dither matrix to an original shape by the scan line changing process. Assume that the line of interest changes to a line immediately below it in the sub-scanning direction at the above-mentioned scan line changing point Pa. In this case, the matrix is offset in advance in a direction opposite to that of the scan line changing process so as to return the dither matrix to an original shape by the scan line changing process. In this example, the direction of the scan line changing process is downward, this direction is represented by −1, and thus OFFSET[Pa]=1 having an opposite sign. Then, a variable Y is initialized in S3, and incremented to the next line in S4. In S5, it is determined whether the position of the pixel of interest has exceeded the sub-scanning width. If the position of the pixel of interest has exceeded the sub-scanning width, the process of one page ends. If the position of the pixel of interest has not exceeded the sub-scanning width, X is initialized in S6, and incremented to the next digit in S7. In S8, it is determined whether the position of the pixel of interest has exceeded the main scanning width. If the position of the pixel of interest has not exceeded the main scanning width, a pixel represented by the coordinates (X,Y) is set as the pixel of interest, and the processes in S9 and subsequent steps is done.

Figure 15:
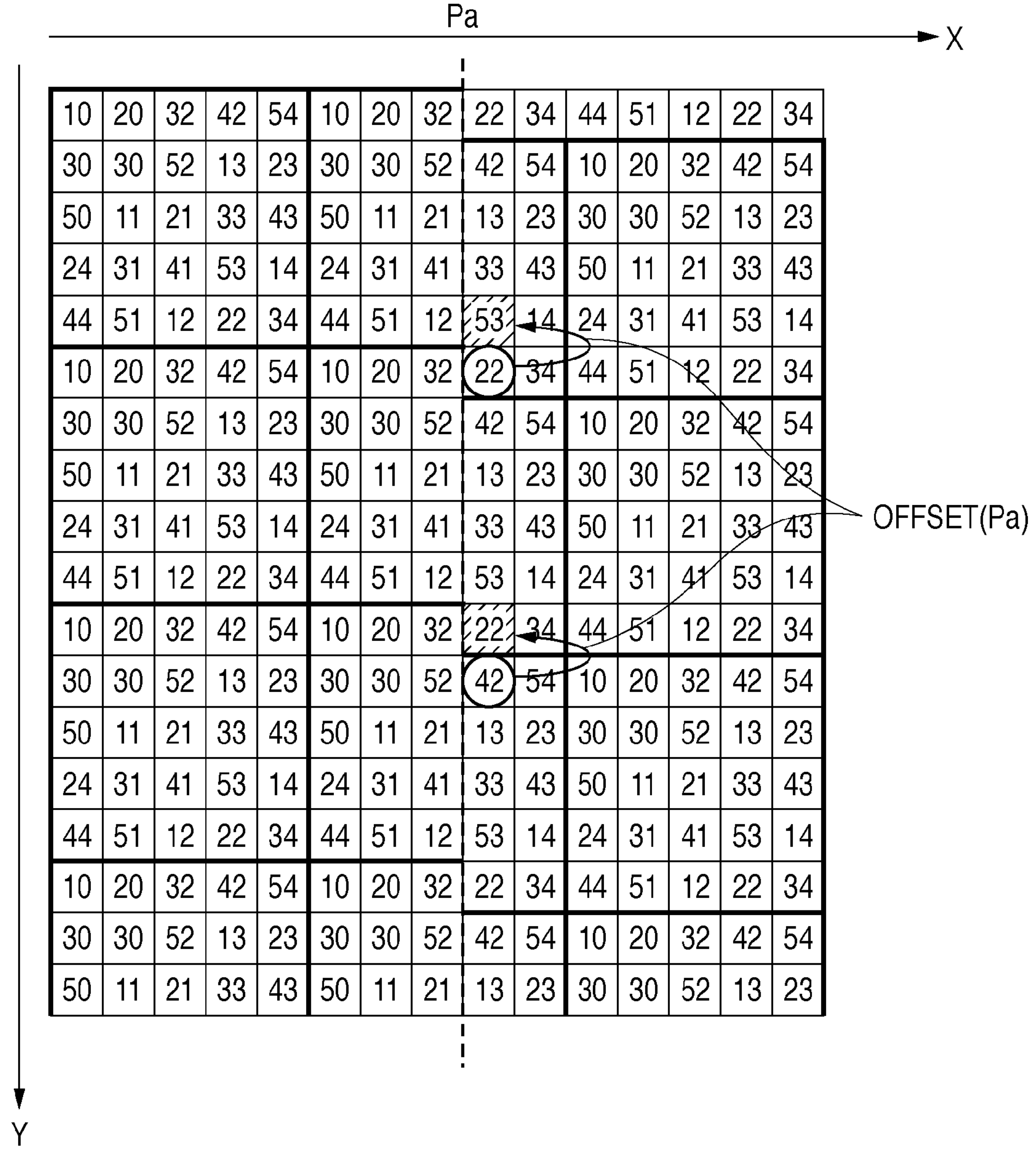
FIG. 15 is a view showing a state in which dither tables are periodically arrayed.

In S9, an offset OFFSET[X] obtained from the phase offset table in correspondence with the position X is added to a counter Y. Remainder calculation is executed for the resultant value using the size of the dither matrix as a modulus. A dither table sub-scanning counter indicates the coordinates of a dither matrix element in the sub-scanning direction. Also in S10, remainder calculation is similarly executed. Note that no phase need be offset in the main scanning direction. Since dither tables are periodically arrayed, as shown in FIG. 15, X1 and Y1 are obtained from the remainders having X_DMAX and Y_30 DMAX as moduli. That is, the coordinates (X1,Y1) of a threshold element in the dither matrix that corresponds to a pixel at the coordinates (X,Y) are given by $$Y1=(Y+\mathrm{OFFSET}[X])\ \mathrm{MOD}\ Y\_DMAX \quad (2)$$

$$X1=X\ \mathrm{MOD}\ X\_DMAX \quad (3)$$

From equations (2) and (3), coordinates in a phase-offset dither table can be obtained.

In S11, the dither table considering the phase offset amount is looked up, and the output pixel value OUT is given by $$\mathrm{OUT}[Y][X]=T[Y1][X1][\mathrm{IN}[Y][X]] \quad (4)$$

Equation (4) expresses the quantization process. For example, equation (4) represents a process to compare the threshold T[Y1][X1] with the input pixel IN[X][Y], and give 1 as OUT[Y][X] if the input pixel value is larger as a result of comparison, and 0 if the input pixel value is smaller. By the processes in S9 to S11, the output value of the screen process considering the amount of phase offset can be attained. The processes in S4 to S8 are repeated for all pixels in the input image.

FIGS. 16A to 16G are views schematically showing an intermediate image and output result in a case where an image process according to the first embodiment is performed for an input image, and those in a case where it is not performed. FIG. 16A shows a phase offset table 1601, and a uniform halftone image 1602 input to the halftone processing unit 407. FIGS. 16B, 16C, and 16D show a case where no phase offset process according to the first embodiment is applied. FIGS. 16E, 16F, and 16G show a case where the first embodiment is applied. FIG. 16B shows an image 1611 obtained by executing the screen process for the image 1602. FIG. 16C shows an image 1612 obtained by executing the scan line changing process for the image 1611. FIG. 16D shows an output result 1613 of the image 1612. The screen pattern is disturbed by the scan line changing process.

To the contrary, FIG. 16E shows an image 1621 obtained by executing the screen process including the phase offset process for the image 1602 in FIG. 16A. In the image 1621, the screen pattern shifts in a direction opposite to that of the scan line changing process at the scan line changing point. FIG. 16F shows an image 1622 obtained by executing the scan line changing process for the image 1621 in FIG. 16E. By the scan line changing process, the shift of the screen pattern is canceled and returns to an original pattern. FIG. 16G shows an output result 1623 of the image 1622 in FIG. 16F.

By adding the phase offset process, a mismatch as shown in FIG. 16D can be eliminated, and an image as shown in FIG. 16G is output to the storage unit 408. For example, the pulse width of a laser beam is modulated in accordance with dot image data read out from the second storage unit 408. A latent image is formed on the photosensitive body in accordance with the dot image data, and developed with toner. The image forming unit of each color component executes the registration error correction process including the scan line changing process, canceling the registration error of an image formed by the image forming unit of each color component.

The first embodiment adds the phase offset process to offset the phase of the dither matrix in an opposite direction in advance by the halftone processing unit 407 when reproducing a halftone image by the screen process. The phase offset process can prevent the phenomenon that the phase of the dither pattern offsets in the sub-scanning direction upon the scan line changing process in the storage unit 408. The first embodiment has described a screen process having a square dither matrix, but is also applicable to a screen process having a rectangular dither matrix.

Second Embodiment

Figure 17A:
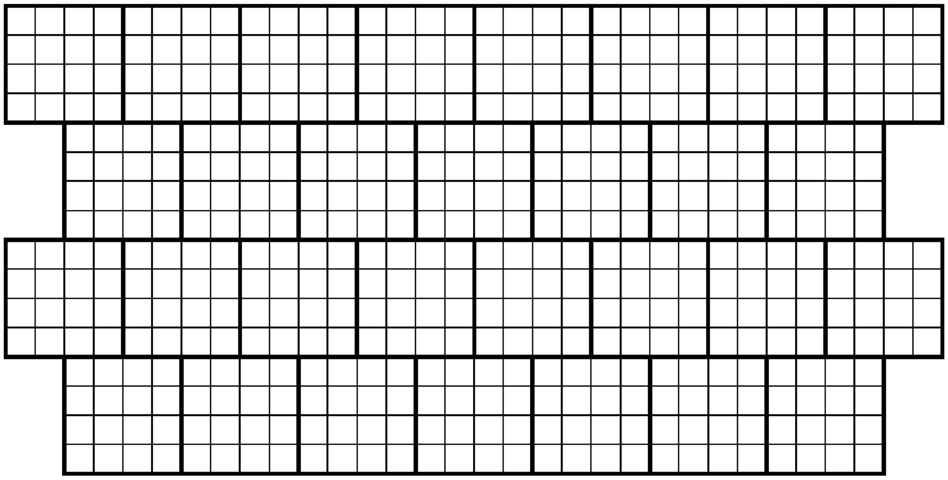
FIGS. 17A and 17B are views showing the array of dither matrices shifted in the main scanning direction.
Figure 18A:
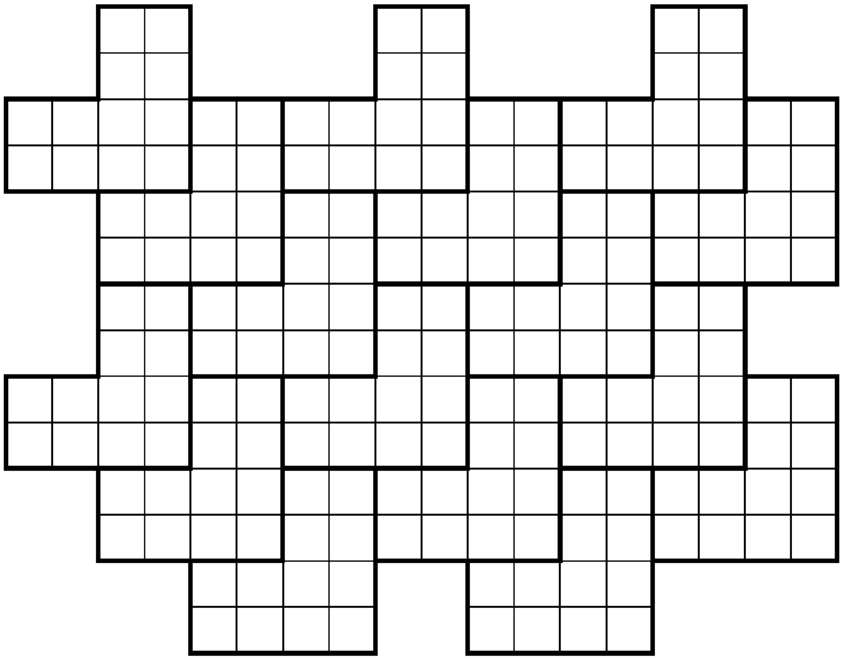
FIGS. 18A and 18B are views showing the array of dither matrices of a shape other than the square or rectangle.

The first embodiment is effective when the dither matrix has a shape and array as shown in FIGS. 11D and 12. However, the first embodiment cannot be applied to the array of dither matrices shifted in the main scanning direction, as shown in FIG. 17A, or a dither matrix of a shape other than the square or rectangular shape, as shown in FIG. 18A. An embodiment applicable to even a screen process using a dither matrix having such a shape and array will be described.

In the second embodiment, unlike the first embodiment, a halftone processing unit 407 does not look up a dither table of thresholds stored in the dither matrix. Instead, the second dither matrix defined by the shape and array of a dither matrix is generated as a new dither matrix, and the table (second dither table) of the second dither matrix is looked up. In the second embodiment, for descriptive convenience, an original dither matrix will be called the first dither matrix, the dither table of the first dither matrix will be called the first dither table. Since the second dither matrix has a simple rectangular shape, the dither matrix has a shape which can be repetitively applied and can also cover entire image data by shifting the dither matrix by the matrix size in the longitudinal and lateral directions.

Figure 19:
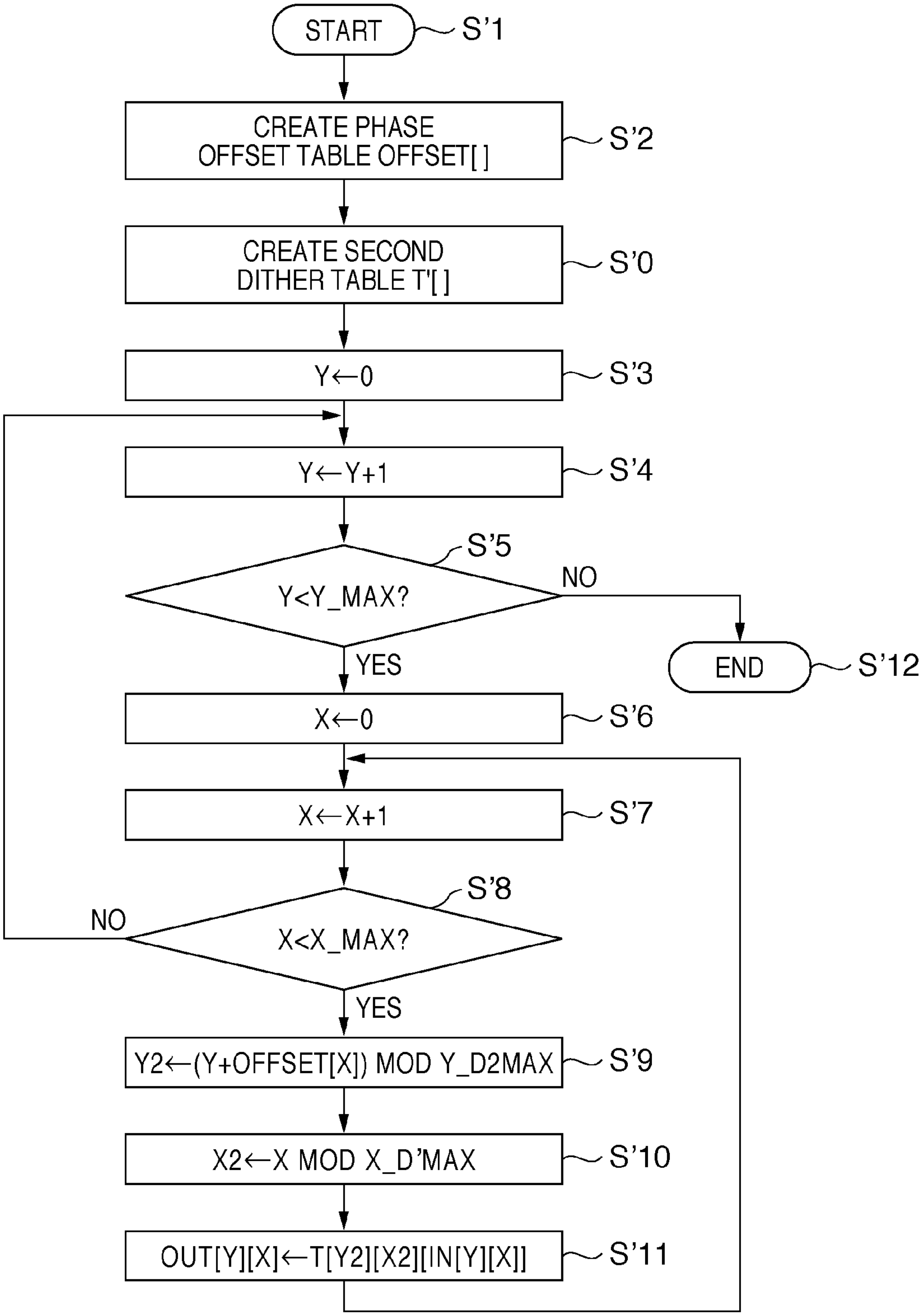
FIG. 19 is a flowchart showing a screen process including a phase offset process in the second embodiment.

FIG. 19 is a flowchart of a screen process including a phase offset process in the halftone processing unit 407 in the second embodiment. X and Y represent counters for an image in the main scanning direction and sub-scanning direction. X2 and Y2 represent counters for the second dither table in the main scanning direction and sub-scanning direction. IN[X][Y] represents an input pixel value, and OUT[X][Y] represents an output pixel value. T' [X2] [Y2] represents the second dither table, and OFFSET[X] represents a phase offset table. X_MAX represents the width of an input image in the main scanning direction, and Y_MAX represents the width of the input image in the sub-scanning direction. X_DMAX represents the width of the first dither table in the main scanning direction, and Y_DMAX represents the width of the first dither table in the sub-scanning direction. X_D2MAX represents the width of the second dither table in the main scanning direction, and Y_D2MAX represents the width of the second dither table in the sub-scanning direction. The sequence in FIG. 19 is different from that in FIG. 13 in that the second dither matrix (dither table) is generated in step S'0 and the second dither matrix is used in steps S'9 to S'11.

Figure 17B:
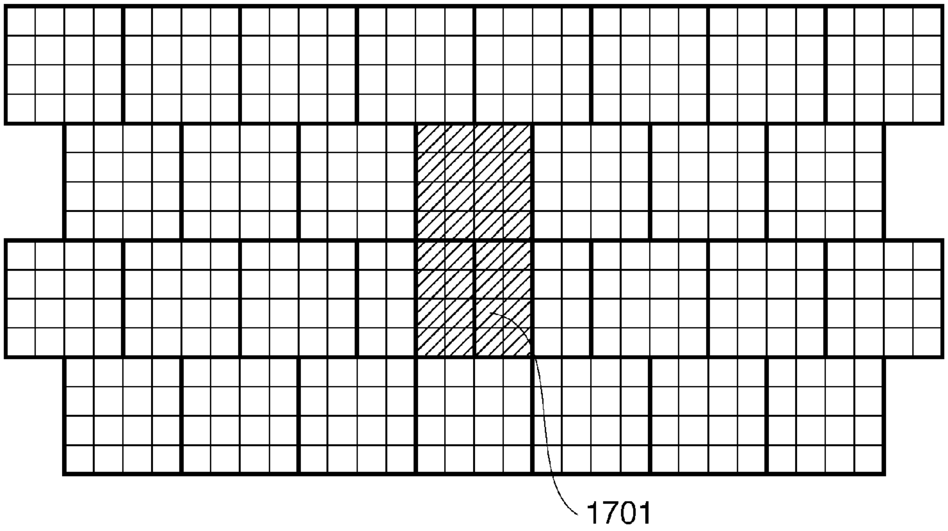
Figure 18B:
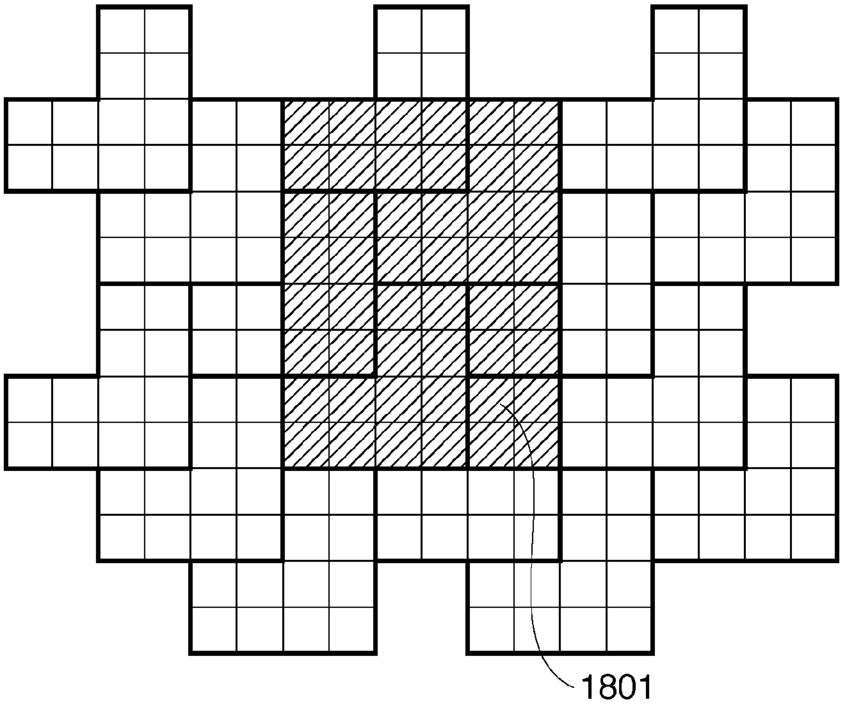

In S'2, the phase offset table OFFSET is created by referring to the profile characteristic. In S'0, the second dither table T' is created. The second dither table T' is a table which contains the first dither matrix, and holds terms in a rectangular matrix (second dither matrix) having periodicity within the table. For example, when the dither matrix has a shape and array as shown in FIG. 17A, a matrix 1701 in FIG. 17B is generated. When the dither matrix has a shape and array as shown in FIG. 18A, a matrix 1801 in FIG. 18B is obtained as the second dither matrix. The second dither matrix is not uniquely determined, but suffices to satisfy the above-described requirement. A generally used dither matrix is determined in advance, so the second matrix can also be determined in advance. In this case, in step S'0, the second dither matrix need not be created and is only referred to. To generate the second dither matrix, the periods of the first dither matrix in the main scanning and sub-scanning directions are determined. A matrix having these periods as longitudinal and lateral sizes is extracted from a threshold table in which the first dither matrices are arranged without any interval, obtaining the second dither matrix.

The threshold table stored in the second dither matrix is attained as the second dither table T'. In S'9, the second dither table sub-scanning counter is incremented, and remainder calculation is executed. In S'11, the output pixel value OUT is determined by looking up the second dither table T' considering the phase offset obtained from the attained phase offset table OFFSET. The processes in S'9 to S'11 are repeated for all pixels in the input image in S'4 to S'8.

As described above, the second embodiment generates the second dither matrix, and looks up the second dither table obtained from it. The second embodiment can perform the phase offset process even in a screen process using an array of dither matrices shifted in the main scanning direction or a dither matrix of a shape other than the rectangle.

Third Embodiment

Figure 20A:
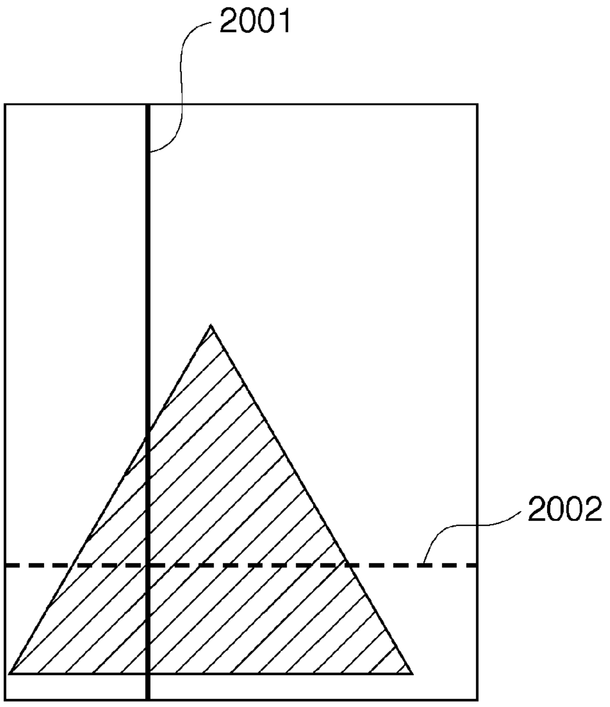
FIGS. 20A and 20B are views showing an output image which is not rotated in an image forming apparatus, and an output image which is rotated.
Figure 20B:
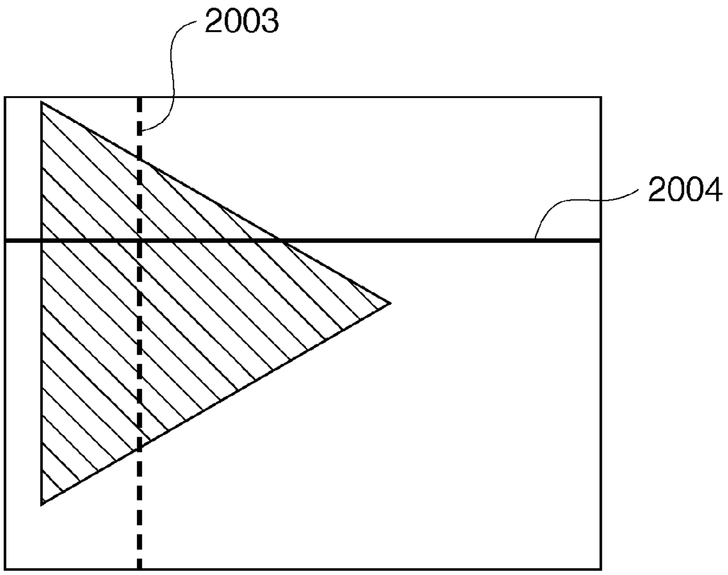

The third embodiment will exemplify a process when rotating and printing an image after the screen process and scan line changing process. FIGS. 20A and 20B are views schematically showing an output image which is not rotated in an image forming apparatus, and an output image which is rotated. In FIG. 20A, a line 2001 represents scan line changing points at which respective scan lines are shifted downward by the scan line changing process before rotating the image. A line 2002 represents points at which occurrence of registration errors is predicted when printing after rotating the image. FIG. 20B shows an image after rotating clockwise through the image shown in FIG. 20A. Lines 2003 and 2004 correspond to lines 2002 and 2001, respectively. Assume that an electrophotographic image forming apparatus which rotates an input image after the screen process performs the screen process including the phase offset process, and the scan line changing process. In this case, if the first and second embodiments are directly applied, the scan line changing point and scan line changing direction are not suited to rotated image data, and no preferable effect can be obtained. More specifically, even if the scan line changing process and phase offset process are done at the scan line changing points 2001, scan line changing points 2004 appears along the main scanning direction owing to a 90° rotation process, as shown in FIG. 20B. The primary purpose of registration error correction cannot be achieved.

To prevent this, the third embodiment executes the scan line changing process and the screen process including the phase offset process at scan line changing points 2002 after rotation in FIG. 20A on the premise of the rotation process so as to correct the registration error when printing a rotated image. An embodiment which considers a scan line changing point and scan line changing direction after rotation and is applicable to even a case where an input image is rotated clockwise through 90°, 180°, and 270° will be explained using equations. X_MAX and Y_MAX represent widths of an input image in the main scanning and sub-scanning directions, and X_DMAX and Y_DMAX represent widths of a dither table in the main scanning and sub-scanning directions. In this phase offset processing system, (X,Y) represent the coordinates of a given pixel, IN[X][Y] represents the pixel value, Xo_OFFSET[Y] represents a phase offset table in the main scanning direction when no image is rotated, and Yo_OFFSET[X] represents a phase offset table in the sub-scanning direction. (Xn,Yn) represent the coordinates of the pixel in the coordinate system of a rotated image when an input image is rotated clockwise through an angle of n. Xr_OFFSET[Xn] [Yn] [n] represents a phase offset table in the main scanning direction, and Yr_OFFSET[Xn][Yn][n]

represents a phase offset table in the sub-scanning direction. The suffix "n" represents the rotational angle.

Figure 21:
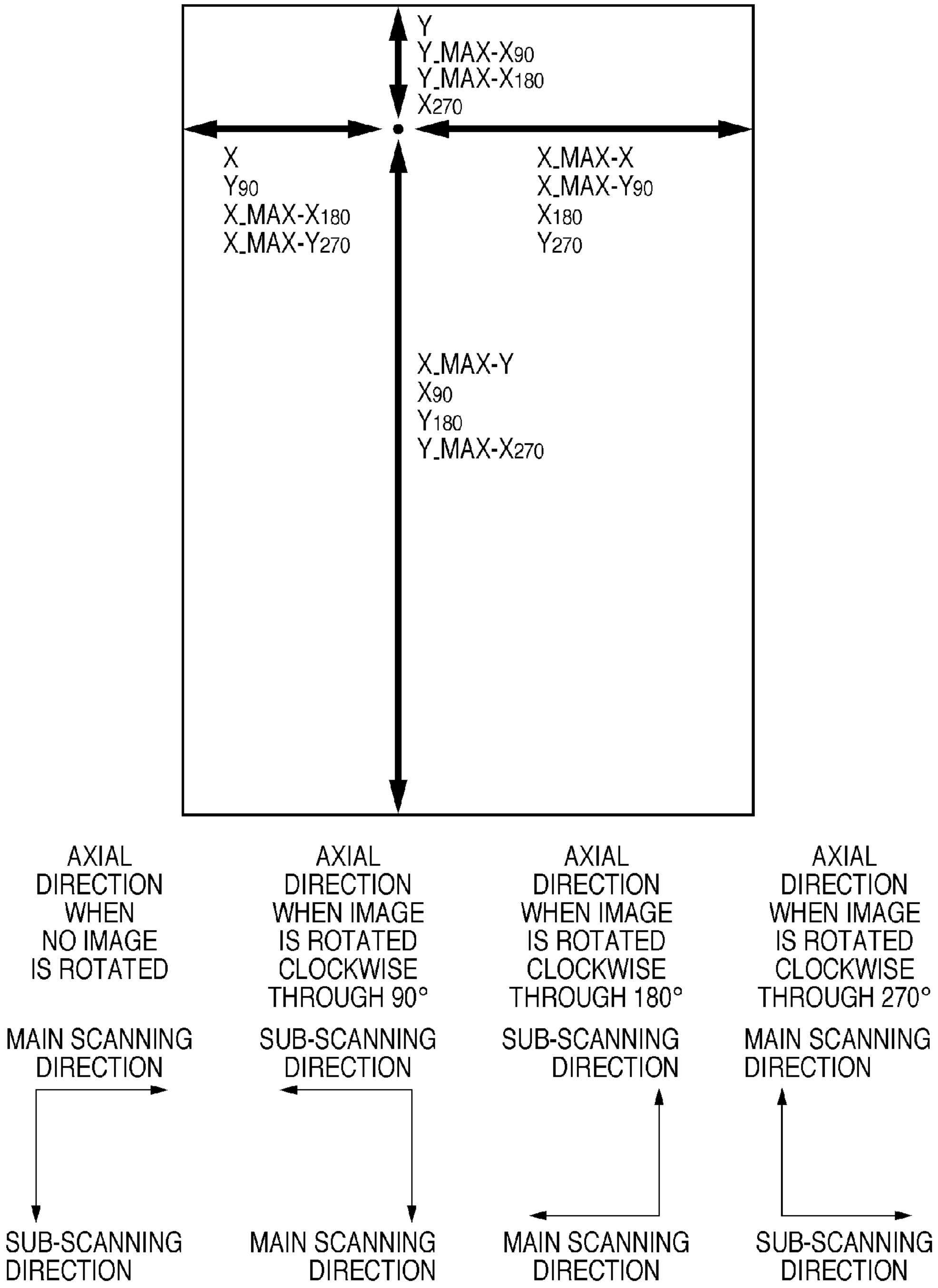
FIG. 21 is a view showing the relationship between X, Y, X_MAX, Y_MAX, Xn, and Yn.

The phase offset table Xo_OFFSET[Y] in the main scanning direction when no image is rotated is always constant at 0 regardless of Y. As shown in FIG. 21, the coordinates (Xn, Yn) and (X,Y) in the coordinate system after rotation satisfy relations given by equations (5) to (8):

$$X=Y90=X\_MAX-X180=X\_MAX-Y270 \quad (5)$$

$$Y\_MAX-Y=X90=Y180=Y\_MAX-X270 \quad (6)$$

$$X\_MAX-X=X\_MAX-Y90=X180=Y270 \quad (7)$$

$$Y=Y\_MAX-X90=Y\_MAX-Y180=X270 \quad (8)$$

Based on these equations, main scanning and sub-scanning phase offset amounts at the respective rotational angles are given by $$\begin{aligned} Xr\_OFFSET[X90][Y90][90] &= -Yo\_OFFSET[Y\_MAX-Y][X] \\ &= -OFFSET[Y\_MAX-Y] \end{aligned} \quad (9)$$

$$\begin{aligned} Yr\_OFFSET[X90][Y90][90] &= Xo\_OFFSET[Y\_MAX-Y][X] \\ &= 0 \end{aligned} \quad (10)$$

$$\begin{aligned} Xr\_OFFSET[X180][Y180][180] &= -Xo\_OFFSET[X\_MAX-X][Y\_MAX-Y] \\ &= 0 \end{aligned} \quad (11)$$

$$\begin{aligned} Yr\_OFFSET[X180][Y180][180] &= -Yo\_OFFSET[Y\_MAX-Y][X] \\ &= -OFFSET[Y\_MAX-Y] \end{aligned} \quad (12)$$

$$\begin{aligned} Xr\_OFFSET[X270][Y270][270] &= Yo\_OFFSET[Y][X\_MAX-X] \\ &= OFFSET[Y] \end{aligned} \quad (13)$$

$$\begin{aligned} Yr\_OFFSET[X270][Y270][270] &= -Xo\_OFFSET[Y][X\_MAX-X] \\ &= 0 \end{aligned} \quad (14)$$

Since the second dither tables are periodically arrayed, X1 and Y1 can be obtained from the remainders of X_D2MAX and Y_D2MAX, deriving equations (15) and (16), wherein X1 and Y1 are the coordinates of an element in the first dither table:

$$Y2=(Y+Xr\_OFFSET[X][Y][n]) \text{ MOD } Y\_D2MAX \quad (15)$$

$$X2=(X+Yr\_OFFSET[X][Y][n]) \text{ MOD } X\_D2MAX \quad (16)$$

The pixel value of an output image is given by $$OUT[Y][X]=T'[Y2][X2][IN[Y][X]] \quad (17)$$

where T'[Y2][X2] is the second dither table.

From equations (9) to (17), the output value of a screen process considering the amount of phase offset after rotation can be attained. Even an image forming apparatus which performs the rotation process after the halftone process can execute the phase offset process.

Fourth Embodiment

Figure 22A:
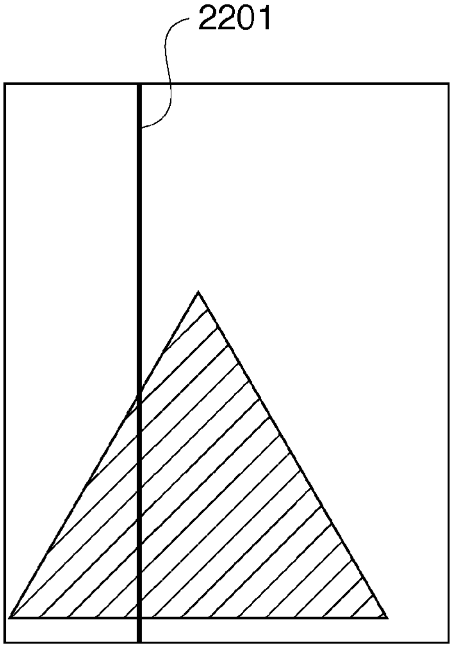
FIGS. 22A to 22C are views showing an unrotated output image, a rotated output image, and an intermediate image when rotating an output image in the fourth embodiment.
Figure 22C:
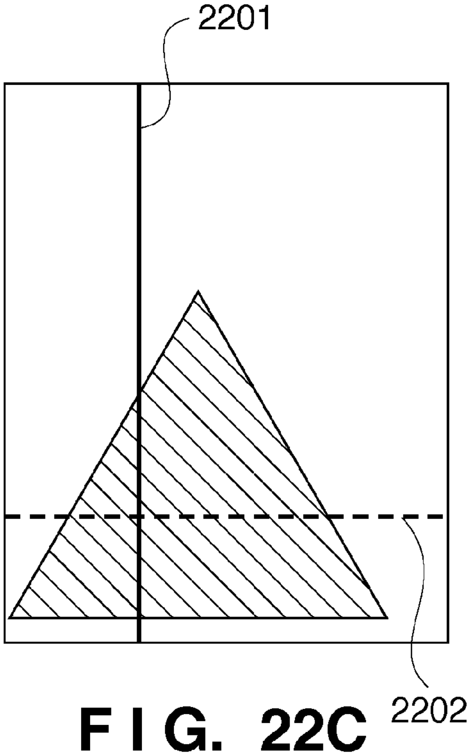
Figure 22B:
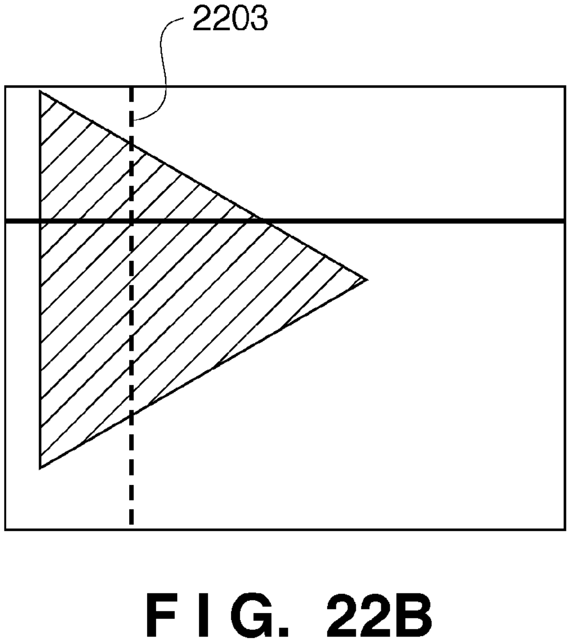

FIGS. 22A to 22C are views schematically showing an unrotated output image, a rotated output image, and an intermediate image when rotating an output image in the fourth embodiment. The third embodiment has exemplified a phase offset process in an image forming apparatus which performs the rotation process after the halftone process. In this case, the array angle (to be referred to as a screen angle hereinafter) of the dither pattern is different between an output image not rotated after the screen process and a rotated output image, as shown in FIGS. 20A and 20B. Owing to the engine characteristic of the image forming apparatus, the gamma value of halftoning changes between the case where an output image is rotated and the case where no output image is rotated, losing the isotropy of an output image. To solve this problem, the dither matrix is rotated counterclockwise through the same angle (rotational angle) as that of an image, as shown in FIG. 22B, when performing the screen process for an image shown in FIG. 22A (this process will be referred to as the first rotation process hereinafter). Then, the screen angle returns to the original one after rotation (to be referred to as the second rotation process hereinafter), obtaining a preferable output image as shown in FIG. 22C. A line 2201 in FIG. 22A represents scan line changing points at which respective scan lines are shifted downward by the scan line changing process before rotating the image. A line 2202 in FIG. 22C represents points at which occurrence of registration errors is predicted when printing after rotating the image. A line 2203 in FIG. 20B represents a scan line changing points at which respective scan lines are occurred shifted downward by the scan line changing process in the rotated image.

An embodiment applicable to even a case where an electrophotographic image forming apparatus having this function rotates an input image clockwise through 90°, 180°, and 270° will be described.

The fourth embodiment is different from the third embodiment in that the first rotation process is done to rotate the dither matrix counterclockwise (i.e., in a direction opposite to the rotational direction of image data) through an angle of n. (X1*n*,Y1*n*) represent the coordinates of a pixel in the dither table when the first rotation process is performed to rotate an input image clockwise through an angle of n. Tr[Y1*n*] [X1*n*] [n] represents a dither table in the coordinate system when the dither table is rotated counterclockwise at an angle of n. X_DMAXn represents the width of the dither table in the main scanning direction, and Y_DMAXn represents the width of the dither table in the sub-scanning direction.

Figure 23:
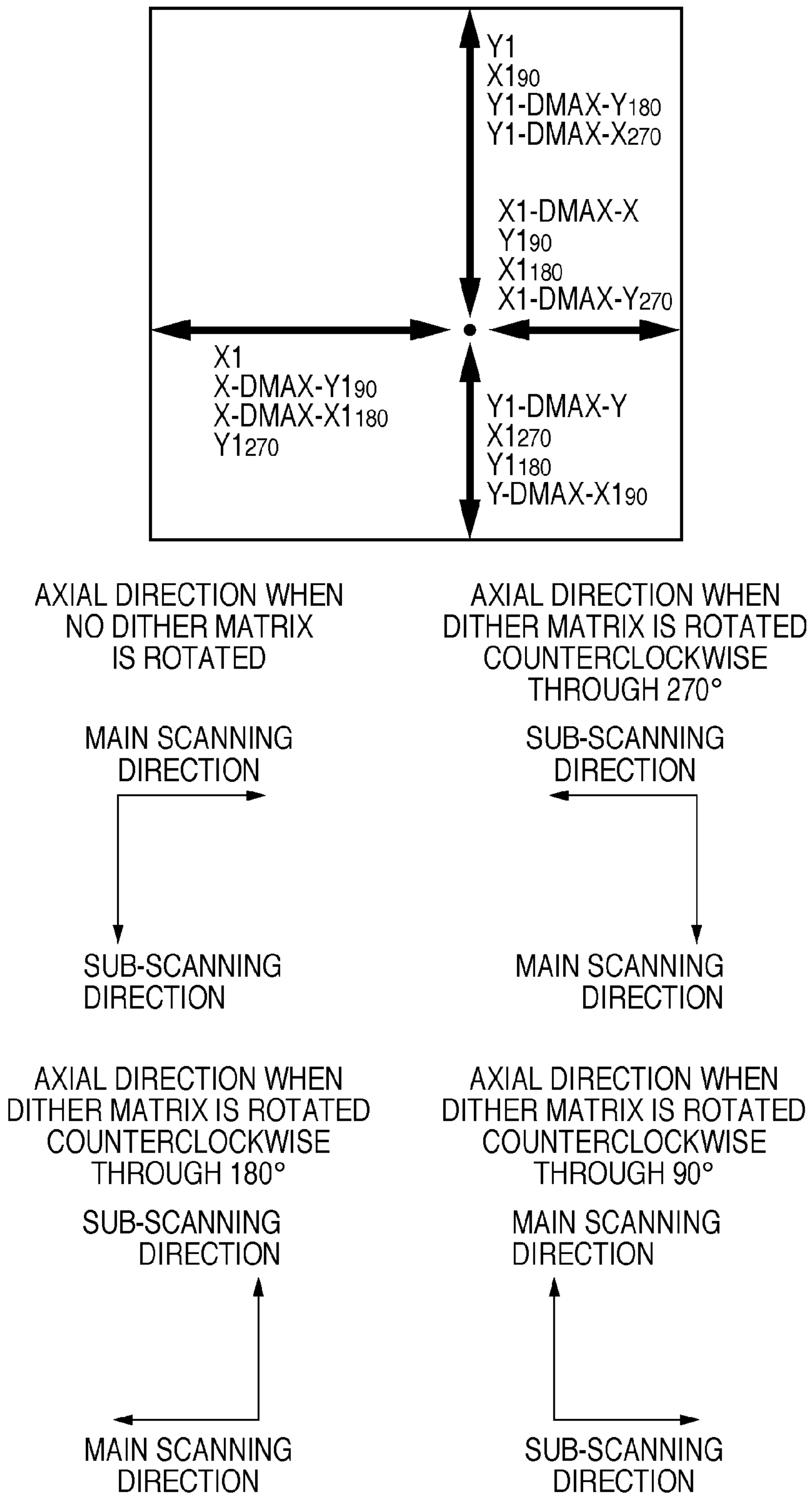
FIG. 23 is a view showing the relationship between X1, Y1, X_DMAX, Y_DMAX, X1*n*, and Y1*n*.
Figure 24A:
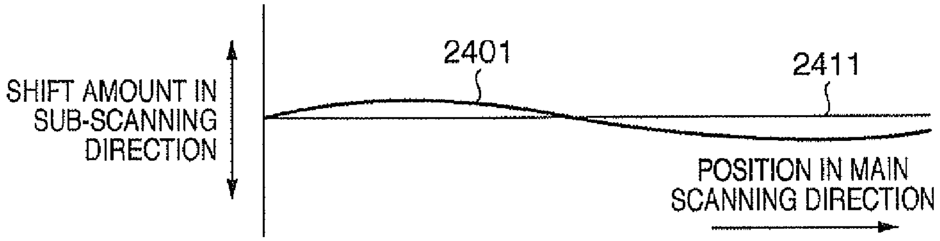
PRIOR ART FIG. 24A
FIGS. 24A to 24D are graphs showing examples of the profile characteristic.
Figure 24B:
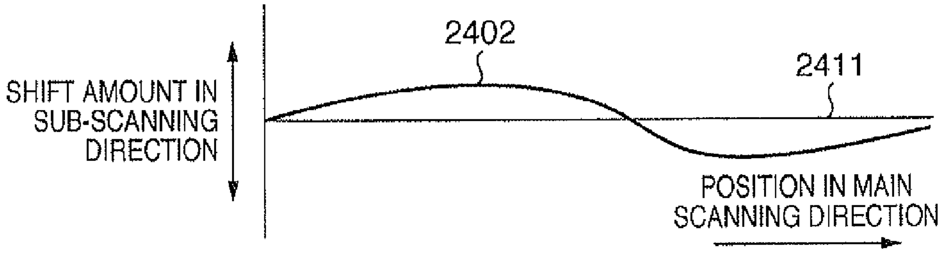
Figure 24C:
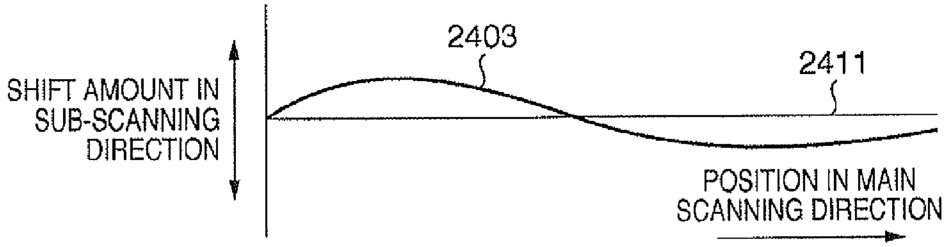
Figure 24D:
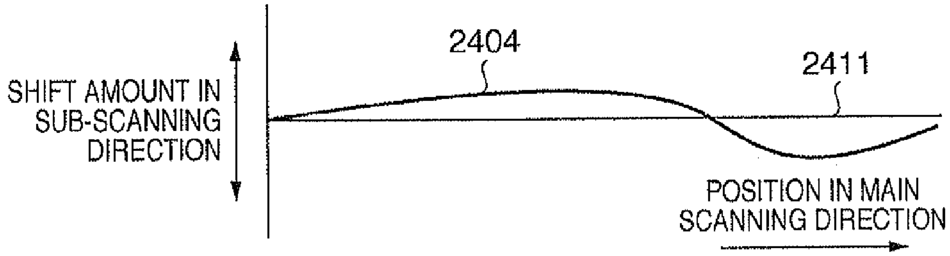
Figure 25A:
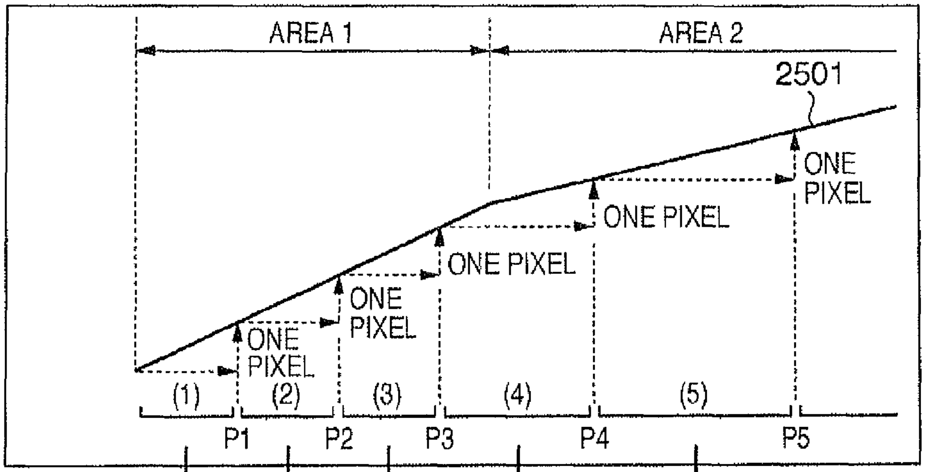
PRIOR ART FIG. 25A
FIGS. 25A to 25C are views showing a scan line changing process.
Figure 25B:
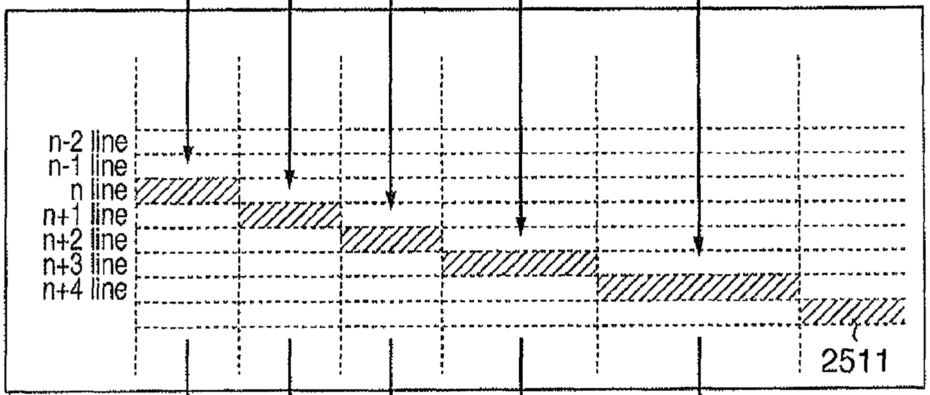
Figure 25C:
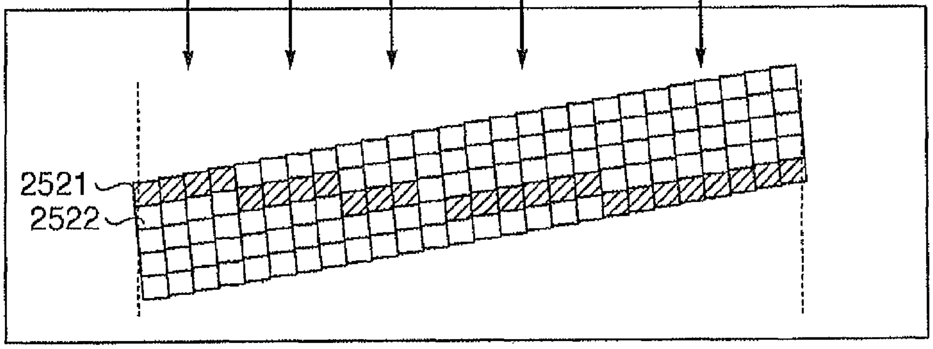
Figure 26A:
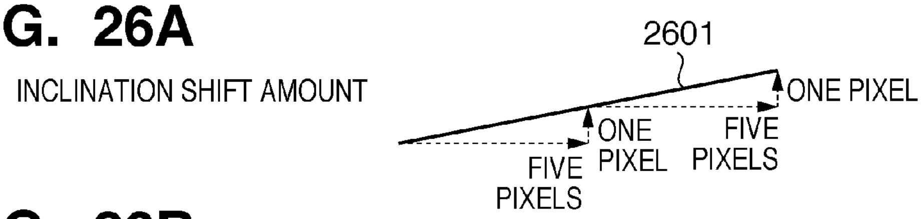
FIGS. 26A to 26F are views showing an interpolation process.
Figure 26B:
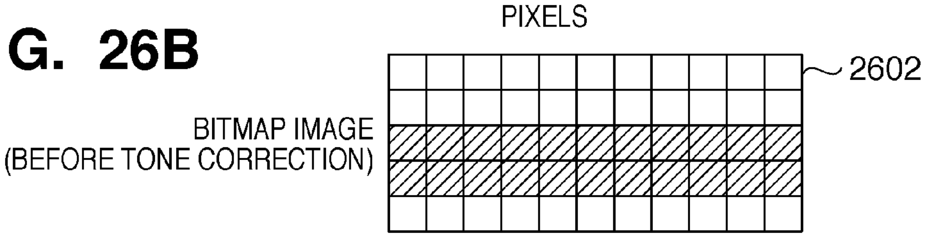
Figure 26C:
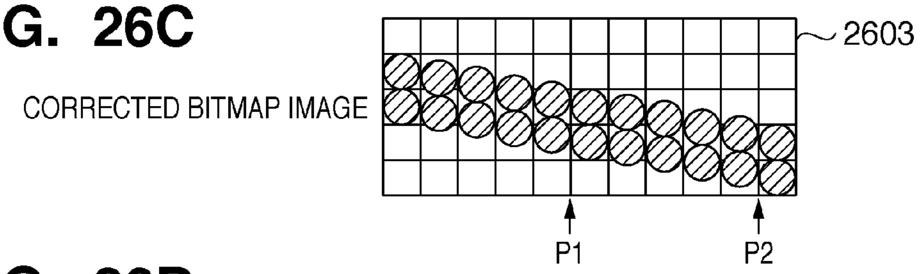
Figure 26D:
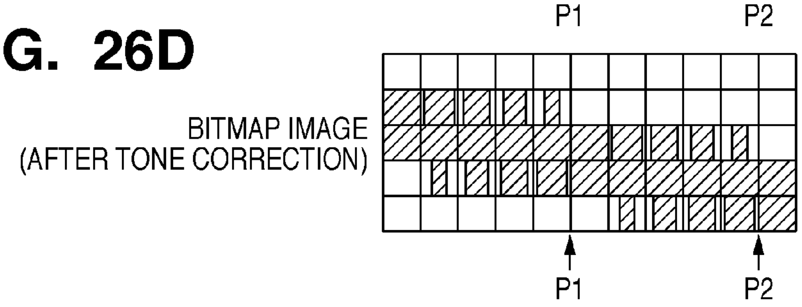
Figure 26E:
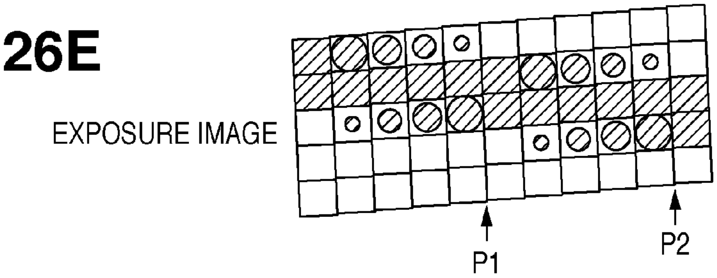
Figure 26F:
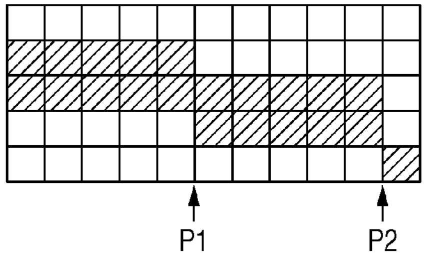

As shown in FIG. 23, the coordinates (X,Y) and the coordinates (Xn,Yn) in the coordinate system after counterclockwise rotation satisfy relations given by equations (17) to (20):

$$X1=X\_DMAX-Y190=X\_DMAX-X1180=Y1270 \quad (17)$$

$$Y\_DMAX-Y1=Y\_DMAX-X190=Y1180=X1270 \quad (18)$$

$$X\_DMAX-X=Y190=X1180=X1\_DMAX-Y1270 \quad (19)$$

$$Y1=X190=Y\_DMAX-Y1180=Y\_DMAX-X1270 \quad (20)$$

Since the lengths of the respective sides of the dither matrix are equal to each other, as shown in FIG. 23, equations (21) and (22) are established:

$$X\_DMAX=Y\_DMAX90=X\_DMAX180=Y\_DMAX270 \quad (21)$$

$$Y\_DMAX=X\_DMAX90=Y\_DMAX180=X\_DMAX270 \quad (22)$$

From equations (17) to (22), the dither table Tr, X1*n*, Y1*n*, X_DMAXn, and Y_DMAXn are obtained. As a result, the same conditions as those in the third embodiment are given, and subsequent calculation of the pixel value of an output image complies with the third embodiment.

By setting in advance the screen angle by the same amount as rotation of an image in an opposite direction, the screen angle returns to an original one upon rotation of image data. A preferred image is formed without changing the gamma value of the halftone process.

Other Embodiments

In the above-described embodiments, the screen process and registration error correction process are done by rotating image data or the dither matrix. However, it is also possible to perform horizontal/vertical conversion for an address from which the pixel of image data or the element of a matrix is read out as if rotated data were referred to. Even in this case, the term "rotation process" is valid because this process is substantially the same as rotation of image data or the dither matrix.

The present invention may also be applied to a system including a plurality of devices (e.g., a host computer, interface device, reader, and printer), or an apparatus (e.g., a copying machine or facsimile apparatus) formed by a single device. The object of the present invention is also achieved by supplying a storage medium which stores program codes for implementing the functions of the above-described embodiments to a system or apparatus, and reading out and executing the program codes stored in the storage medium by the computer of the system or apparatus. In this case, the program codes read out from the storage medium implement the functions of the above-described embodiments, and the storage medium which stores the program codes constitutes the present invention.

The present invention also includes a case where an OS (Operating System) or the like running on the computer performs part or all of actual processing based on the instructions of the program codes and thereby implements the functions of the above-described embodiments. Further, the present invention is also applied to a case where the program codes read out from the storage medium are written in the memory of a function expansion card inserted into the computer or the memory of a function expansion unit connected to the computer. In this case, the CPU or the like of the function expansion card or function expansion unit performs part or all of actual processing based on the instructions of the written program codes, and thereby implements the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-199901, filed Jul. 31, 2007 which is hereby incorporated by reference herein in its entirety.

What is claimed is:

1. An image forming apparatus which has, for each color component, an image forming unit for forming an image, and which forms a color image by compositing images of respective color components, the apparatus comprising:

a screen processing unit configured to perform a screen process for dot image data to obtain a quantized image data based on a dither matrix, where a position of a dither matrix element is shifted in accordance with both a shift amount of a scan line in a sub-scanning direction on an image carrier of the image forming unit and a rotational angle of a rotation process to be applied to the quantized image data;

a rotation processing unit configured to rotate the quantized image data by the rotational angle;

a registration error correction unit configured to shift, in the sub-scanning direction, a position of each pixel of the quantized image data obtained by said screen processing unit, so as to offset the shift amount of the scan line in the sub-scanning direction on the image carrier of the image forming unit; and an interpolation processing unit configured to adjust pixel values of pixels of the quantized image data generated by the screen process using the shifted dither matrix, between preceding and succeeding pixels in the sub-scanning direction, so as to smooth a step generated due to the shift of the position of each pixel by the registration error correction unit.

2. The apparatus according to claim 1, wherein said screen processing unit comprises a generation unit configured to generate a new dither matrix by shifting a position of an element of an original dither matrix in accordance with the shift amount of the scan line in the sub-scanning direction on the image carrier of the image forming unit before performing the screen process, and a unit configured to execute the screen process by using the new dither matrix.

3. The apparatus according to claim 1, wherein said screen processing unit rotates the dither matrix by the rotational angle in a direction opposite to a rotational direction by said rotation processing unit, shifts the position of rotated dither matrix element in accordance with both the shift amount and the rotational angle, and performs the screen process using the rotated and shifted dither matrix.

4. An image correction method in an image forming system which has, for each color component, an image forming unit for forming an image, and which forms a color image by compositing images of respective color components, the method comprising:

a screen processing step of performing a screen process for dot image data to obtain a quantized image data based on a dither matrix, where a position of a dither matrix element is shifted in accordance with both a shift amount of a scan line in a sub-scanning direction on an image carrier of the image forming unit and a rotational angle of a rotation process to be applied to the quantized image data a rotation processing step of rotating the quantized image data by the rotational angle;

a registration error correction step of shifting, in the sub-scanning direction, a position of each pixel of the quantized image data obtained in the screen processing step so as to offset the shift amount of the scan line in the sub-scanning direction on the image carrier of the image forming unit; and an interpolation processing step of adjusting pixel values of pixels of the quantized image data generated by the screen process using the shifted dither matrix, between preceding and succeeding pixels in the sub-scanning direction, so as to smooth a step generated due to the shift of the position of each pixel in the registration error correction step.

5. A non-transitory computer-readable storage medium storing a program which causes one or more computers that have, for each color component, image forming unit for forming an image, and which forms a color image by compositing images of respective color components, to function as a screen processing unit configured to perform a screen process for dot image data to obtain a quantized image data based on a dither matrix, where a position of a dither matrix element is shifted in accordance with both a shift amount of a scan line in a sub-scanning direction on an image carrier of the image forming unit and a rotational angle of a rotation process to be applied to the quantized image data;

a rotation processing unit configured to rotate the quantized image data by the rotational angle;

a registration error correction unit configured to shift, in the sub-scanning direction, a position of each pixel of the quantized image data obtained by said screen processing means so as to offset the shift amount of the scan line in the sub-scanning direction on the image carrier of the image forming unit; and an interpolation processing unit configured to adjust pixel values of pixels of the quantized image data generated by the screen process using the shifted dither matrix, between preceding and succeeding pixels in the sub-scanning direction, so as to smooth a step generated due to the shift of the position of each pixel by the registration error correction unit.

6. An image forming system which has, for each color component, an image forming unit for forming an image, and which forms a color image by compositing images of respective color components, the system comprising:

a screen processing unit configured to perform a screen process for dot image data to obtain a quantized image data based on a dither matrix, where a position of a dither matrix element is shifted in accordance with both a shift amount of a scan line in a sub-scanning direction on an image carrier of the image forming unit and a rotational angle of a rotation process to be applied to the quantized image data;

a rotation processing unit configured to rotate the quantized image data by the rotational angle;

a registration error correction unit configured to shift, in the sub-scanning direction, a position of each pixel of the quantized image data obtained by said screen processing unit, so as to offset the shift amount of the scan line in the sub-scanning direction on the image carrier of the image forming unit; and an interpolation processing unit configured to adjust pixel values of pixels of the quantized image data generated by the screen process using the shifted dither matrix, between preceding and succeeding pixels in the sub-scanning direction, so as to smooth a step generated due to the shift of the position of each pixel by said registration error correction unit.

* * * * *